(12) United States Patent
Dermitzakis et al.

(10) Patent No.: US 11,691,895 B2
(45) Date of Patent: Jul. 4, 2023

(54) MULTI-CHAMBER COMPRESSOR OF MECHANICAL VAPOR RE-COMPRESSION AND WATER TREATMENT METHODS

(71) Applicants: Emmanuil Dermitzakis, Attikis (GR); Aristeidis Dermitzakis, Attikis (GR)

(72) Inventors: Emmanuil Dermitzakis, Attikis (GR); Aristeidis Dermitzakis, Attikis (GR)

( * ) Notice: Subject to any disclaimer, the term of this patent is extended or adjusted under 35 U.S.C. 154(b) by 0 days.

(21) Appl. No.: 16/645,448

(22) PCT Filed: Sep. 7, 2018

(86) PCT No.: PCT/GR2018/000043
§ 371 (c)(1),
(2) Date: Mar. 6, 2020

(87) PCT Pub. No.: WO2019/048894
PCT Pub. Date: Mar. 14, 2019

(65) Prior Publication Data
US 2020/0339439 A1 Oct. 29, 2020

(30) Foreign Application Priority Data

Sep. 7, 2017 (GR) .............................. 20170100407

(51) Int. Cl.
*C02F 1/04* (2023.01)
*B01D 1/26* (2006.01)
(Continued)

(52) U.S. Cl.
CPC ................ *C02F 1/041* (2013.01); *B01D 1/26* (2013.01); *B01D 1/2881* (2013.01);
(Continued)

(58) Field of Classification Search
CPC ......... C02F 1/041; B01D 1/26; B01D 1/2881; B01D 1/2884; B01D 1/2887; B01D 1/2893
See application file for complete search history.

(56) References Cited

U.S. PATENT DOCUMENTS 2,894,879 A * 7/1959 Hickman ................. B01D 3/08
203/27
3,567,591 A * 3/1971 Othmer .................. F04D 31/00
203/26

(Continued)

*Primary Examiner* — Jonathan Miller
(74) *Attorney, Agent, or Firm* — Michael D. Eisenberg

(57) ABSTRACT

Multi-chamber Compressor (6, 206, 506) of Mechanical Vapor re-Compression (MVC) and water treatment methods, the compressor bearing independent compression chambers of positive displacement, for heat-pumps, of two main variants: a) reciprocating-rotary motion (6, 206) wherein the compression chambers (7V) are radially arranged cylindrical sectors based on concentric circular sectors of the same angle, with, pistons of radially arranged vanes (20, 220) of respective surface and with the plane of the vanes passing through the axis of the common rotor (14) and the shaft (16) and b) reciprocating-linear motion (506) wherein the compression chambers (52v) are in series arranged cylinders with pistons/vanes (50v) of corresponding circular surfaces and with the plane of the vanes perpendicular to the common shaft (51). In both cases, the shaft (16, 51) and the motor are common to all the vanes (20v, 50v), which follow identical strokes. The surfaces of the vanes (20v, 50v), as well as of the compression chambers (7V, 52v), differ from each other, since each compression chamber (7V, 52v) has its own and independent pair of evaporation (ev, dv, Lv, by) and heat-exchanger chambers/areas (Cv/eCv, 32v/33v, 132v, 54v/53v), said compression chamber exclusively sucks from, compresses and discharges to, and the fluids/vapors being dispensed, are under different thermodynamic state conditions. The stages are independent from each other, the (Continued)

medium-vapor providing the energy of evaporation is produced in the stage itself, and flow rate and compression ratio CR are independently controlled and adjusted in each stage.

11 Claims, 9 Drawing Sheets

(51) Int. Cl.
    *B01D 1/28* (2006.01)
    *C02F 103/08* (2006.01)
    *F01C 1/30* (2006.01)
    *F01C 9/00* (2006.01)
    *F04C 2/30* (2006.01)
    *F04C 9/00* (2006.01)
    *F04C 18/30* (2006.01)
    *F04C 21/00* (2006.01)

(52) U.S. Cl.
    CPC ......... *B01D 1/2884* (2013.01); *B01D 1/2887* (2013.01); *B01D 1/2893* (2013.01); *C02F 2103/08* (2013.01); *F01C 1/30* (2013.01); *F01C 9/002* (2013.01); *F04C 2/30* (2013.01); *F04C 9/002* (2013.01); *F04C 18/30* (2013.01); *F04C 21/002* (2013.01)

(56) References Cited

U.S. PATENT DOCUMENTS

| | | | | |
|---|---|---|---|---|
| 4,186,058 A * | 1/1980 | Katz | ............... | B01D 1/2881 202/180 |
| 5,520,008 A * | 5/1996 | Ophir | ............... | F04D 29/023 416/185 |
| 5,853,549 A * | 12/1998 | Sephton | ............... | F28F 27/02 203/2 |
| 6,261,419 B1 * | 7/2001 | Zebuhr | ............... | B01D 1/223 159/18 |
| 7,251,944 B2 * | 8/2007 | Holtzapple | ............... | B01D 1/0058 62/333 |
| 7,427,336 B2 * | 9/2008 | Zebuhr | ............... | B01D 1/223 159/28.6 |
| 9,770,676 B2 * | 9/2017 | Zebuhr | ............... | B01D 1/227 |
| 10,046,250 B2 * | 8/2018 | Zebuhr | ............... | C02F 1/041 |
| 2002/0088243 A1 * | 7/2002 | Holtzapple | ............... | F24F 5/00 62/268 |
| 2005/0183440 A1 * | 8/2005 | Holtzapple | ............... | B01D 1/0058 62/333 |
| 2005/0279620 A1 * | 12/2005 | Zebuhr | ............... | F28D 9/0018 202/182 |
| 2008/0083605 A1 * | 4/2008 | Holtzapple | ............... | C02F 1/66 203/11 |
| 2012/0199534 A1 * | 8/2012 | Holtzapple | ............... | B01D 1/26 210/664 |
| 2016/0039683 A1 * | 2/2016 | Sparrow | ............... | C02F 1/008 203/2 |

* cited by examiner

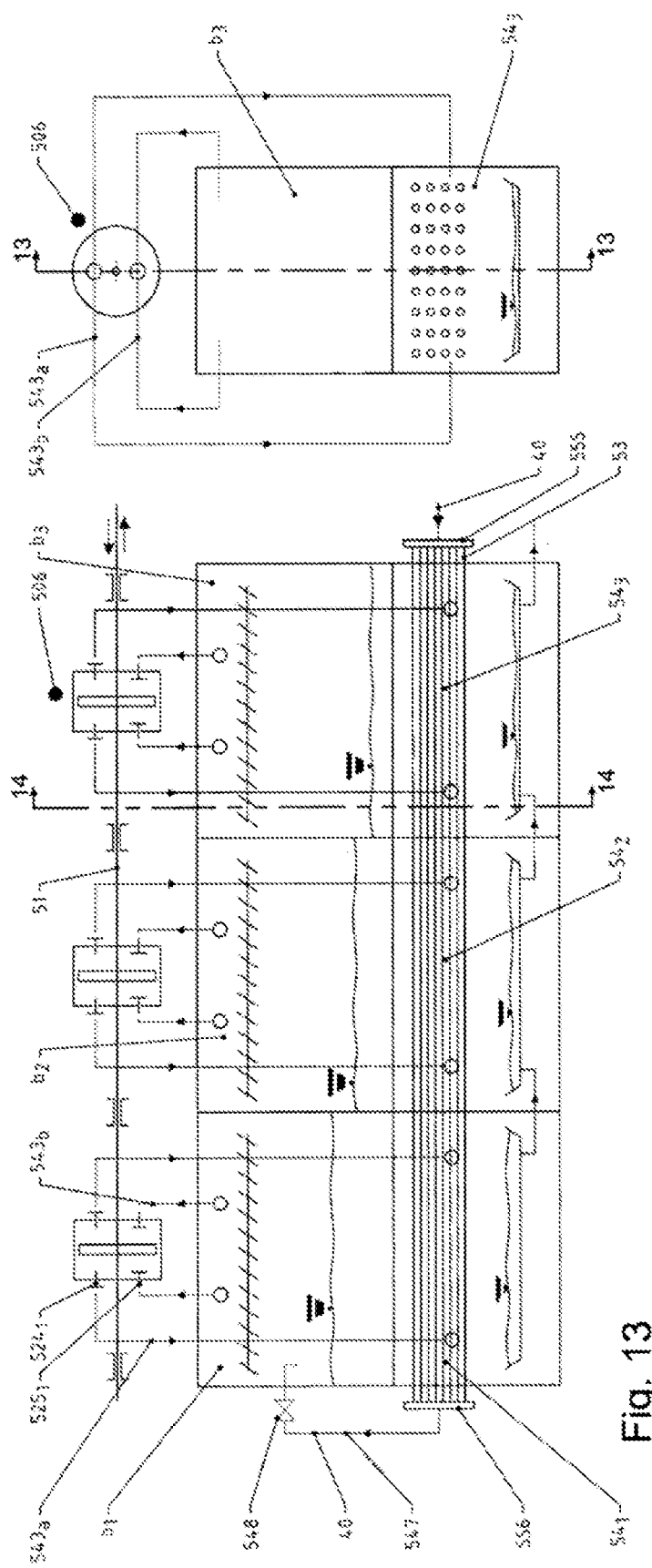

MULTI-CHAMBER COMPRESSOR OF MECHANICAL VAPOR RE-COMPRESSION AND WATER TREATMENT METHODS

The invention relates to positive displacement, reciprocating, rotary or linear motion compressors of Mechanical Vapor re-Compression (MVC) used in multi-stage heat-pumps and water treatment systems, (desalination, condensation of aqueous solutions, etc.).

STATE OF THE ART

Positive displacement centrifugal and rotary compressors (gears, lobes, sliding vanes, screws, etc.) are used by heat-pumps and existing single-stage and multi-stage Mechanical Vapor re-Compression (MVC) systems in desalination, industrial waste, condensation of aqueous solutions in industry, etc. The centrifugal ones are most often used. Such applications are noted e.g. at:

U.S. Pat. Nos. 1,150,713 και 1,200,996, 5,676,801, WO2014/115079, U.S. Pat. Nos. 5,676,801, 5,772,850, DE3327958, JPS6483890, WO2007/148338, U.S. Pat. No. 5,520,008, WO2016/138343, U.S. Pat. No. 2,589,406, DE4431887, WO01/98665, etc.

An important role in the development of heat-pumps have both, (a) the compressor and (b) the efficient multi-stage systems.

Regarding the centrifugal compressor, its growth and size is limited by (a) the very large specific volume of the vapor as the state-of-the-art systems require in a single phase the movement of significant volumes of low temperature vapors and (b) the peripheral speed of the compressor blade's tip which cannot exceed certain limitations (noise, etc.).

The energy for the operation of the heat-pump is mainly the energy for the compressor. For the immediate start-up of the process it is additionally necessary (and only for the start-up phase) to pre-heat the feed-water by an external source until it reaches the boiling temperature of the system. The process then continues and is maintained only by the mechanical energy provided by re-compression of the vapors by the compressor.

In their multi-stage version, (MVC) systems are mainly Multi-Effect Evaporation/Desalination (MEE/MED) type and are usually comprised of, a) a centrifugal compressor (or, more rarely, a positive displacement lobe-type compressor) for the whole system, b) an external multi-stream pre-heat exchanger of the feed-water and c) evaporation and condensers/heat-exchangers chambers with a brine spray system. More specifically:

The brine circulates from the first to the last stage, evaporates continuously, while gradually, its temperature decreases and its salinity increases. In order to maintain boiling and evaporation in all stages, the vacuum is increased from the first to the last stage, whereby the boiling point of the brine is progressively reduced.

In the state-of-the-art Mechanical Vapor re-Compression Systems (MVCs), the vapor produced at the last and coldest stage is sucked and compressed by, the single mechanical compressor, becomes superheated, its temperature rises to the system's highest temperature, the vapor runs externally around the entire system and is fed to the heat-exchanger of the first and warmest stage, where it is condensed to desalinated water, transferring sensible and latent heat for the boiling of the brine of the first stage and the production of its saturated vapors. This saturated vapor is directed and flows into the heat-exchangers of the second stage, heating and evaporating its brine and producing its saturated vapor, which in turn is fed to the next stage, and so on.

The brine of each stage is pumped and sprayed by a grid of nozzles within the same stage, mainly spraying externally the surface of the heat-exchanger in the interior of which the saturated vapor, produced in the previous stage, is flowing, with its temperature corresponding to the temperature conditions of the previous and warmer stage.

The disadvantages of these multi-stage systems are many and significant, such as: at the thermodynamic aspect itself, at the control and coordination of the state/thermodynamic conditions and also at the constructional/manufacturing level. In particular:

a) Significant increase of entropy, since in a single phase and with a single compressor, the vapor is compressed with a very high compression ratio CR (>1,8) in order to cover, the total temperature difference $\Delta T_{max}$ required for the whole multi-stage system/unit (e.g. by a three-stage system/unit, the total temperature difference required, is 10-12° C. which significantly increases the entropy), b) great difficulty in determining, regulating, coordinating and maintaining the required temperatures and salinities of the brine and in particular the temperatures of the vapor produced at each stage and being fed for condensation to the next one, c) bulky vapor ducts connecting the stages, since vapors circulate by natural draft between the stages.

d) bulky and of low-efficiency heat-exchangers, since vapors circulate in the heat-exchangers (except the heat-exchanger of the first stage) by natural draft (low velocity) with all that it implies.

(e) reduced vapor amount (and production thereof) due to the loss of vapor pressure in the droplet separators and connecting ducts, which due to natural draft, reduces the active pressure (head and energy loss) for the vapor circulation.

Substantial disadvantages that reduce production, increase the volume and cost of the installation/plant, over-complicate the standardization and control, and increase the minimum temperature difference ($\Delta t_v$) for the operation of the different stages and overall energy consumption. The latter (increase of minimum temperature difference) drastically reduces the number of stages that can be served by a single compressor with an obvious reduction in the plant's efficiency.

The above disadvantages arise from the fact that a single compressor is used for the entire system/unit which must raise the temperature of the vapor by re-compressing it from the boiling point of the last and colder stage to the highest temperature $T_{max}$ of the system (first stage).

For these reasons, the state-of-the-art technologies, using a single compressor, have to face very unstable conditions, balancing between many contradictory parameters, since:

a) the temperature differences between stages ($\Delta t_v$) must be very small/low, as should the maximum temperature difference $\Delta T_{max}$ of the system be as well, in order not to increase entropy, while at the same time $\Delta T_{max}$ must be high enough to be sufficient and to serve as many stages as possible (since $\Delta T_{max} = \Sigma \Delta t_v$), in order to increase the system's overall efficiency [low temperature differences ($\Delta t_v$) are obviously, for the state-of-the-art, very difficult to control, maintain and coordinate].

b) there is a limitation on the increase in the speed of rotation as well as the increase in the rotor blade radius of the centrifugal compressor since the peripheral speed of the blade's tip must not exceed a certain maximum value. Difficult task, when all energy-pressure head must be created by a single compressor. If a positive displacement lobe compressor is used instead, the volume and costs are much higher while the benefits and yields are considerably lower.

Since the above conditions are difficult to be combined, the maximum number of stages that can be served and achieved is very small compared to the corresponding classical multi-stage thermal systems without vapor re-compression, such as the Multi-stage Flash Evaporation (MSF) and the Multi-Effect Evaporation/Desalination (MEE/MED).

In addition, a single compressor for all stages has considerable volume and high cost because it carries large quantities of large specific volumes of vapors, while in the case of placing an independent compressor for each stage, while being thermodynamically sound, will pose enormous constructional issues and raise the costs even higher.

Moreover, vapor is required to run twice the entire length of the unit, once internally by transferring the saturated vapor from stage to stage, and once externally in the reverse direction, from the last and coldest stage to the first and warmest. This results in heat and pressure losses, higher energy consumption, regulatory/adjustment difficulties, reduced production, large volume and unit costs, and inability to standardize (modulation) of the stages (manufacturing and transportation-wise issues).

For all these reasons, manufacturers prefer to install a plurality of parallel-linked single-effect evaporator desalination units, two-stage or at most three-stage units, in order to increase the daily production, since with the smallest number of stages per unit, they have better control over the operating conditions (more precise control over the small differences of thermodynamic state conditions required between stages), and encounter the issue of transporting them. The brine in these applications does not circulate sequentially from unit to unit, but is rejected independently from each unit, resulting in reduced overall efficiency of the parallel array of units.

BRIEF DESCRIPTION OF THE INVENTION

Reciprocating positive displacement compressors for Mechanical Vapor re-Compression (MVC), with multiple independent dual action chambers used in multi-stage heat-pumps of water treatment systems, (e.g. desalination, industrial waste) or condensation of aqueous solutions, etc.

They are applicable to all known thermal desalination Mechanical Vapor re-Compression systems (e.g. MVC-MEE/MED, MVC-MSF, etc.) and are of two variants a) reciprocating-rotational and b) reciprocating-linear motion, where:

a) in their rotational version, the compression chambers are radially arranged cylindrical sectors based on concentric circular sectors extending at the same central angle, with compression pistons of radially arranged flat vanes of corresponding surface which rotate reciprocally in the compression chambers, being mounted on a common rotor/shaft and b) in the linear version, the successive compression chambers as well as the respective pistons/vanes are linearly arranged and preferably of circular form and the pistons/vanes move linearly reciprocally being mounted on a common shaft.

The surfaces of the vanes/pistons, as well as the respective compression chambers, preferably differ from each other, since operationally each compression chamber has preferably its own and independent pair of evaporation and heat-exchanger chambers/areas, from and to the compression chamber sucks, compresses and discharges, and the fluids/vapors being dispensed are under different thermodynamic state conditions. Each compression chamber adjusts its own flow rate and its compression ratio CR (and reheating $\Delta t_v$) independently of the others.

The rotary-radial compressor is studied herein in a multi-stage (four-stage) version of a flash evaporation desalination process with mechanical vapor re-compression (MVC-MSF), wherein:

The four evaporation chambers of the unit are enclosed by two coaxial cylindrical shells, an outer one and an inner sleeve-cylinder of smaller diameter in comparison, between of which are developed four radially arranged chambers (cylindrical sectors) which are laterally separated from each other by four crosswise arranged vertical spacers.

The roofs of the evaporation chambers of the stages are covered by a common and uniform, preferably horizontal circular roof cover. The bottoms of the evaporation chambers are preferably a circular horizontal plane common for all stages.

On top of the evaporation chambers is located the compressor with four compression chambers, each one of which corresponding to the evaporation chambers, being also radially arranged cylindrical sectors and based on almost the same circular sectors with the evaporation chambers. They are separated by approximately the same crosswise arranged vertical spacers that project upwards.

Inside the compression chambers are developed two for each chamber, identical and narrow, opposite facing collection chambers (based on circular sectors) which are restricted laterally, internally by two radially arranged vertical spacers and externally by the crosswise arranged radial vertical spacers of the respective compression chamber.

All collection chambers are extending at the same acute central angle $\beta°$, are restricting, sideways, at an area corresponding to two-fold the central angle $\beta°$ (=2*$\beta°$) in total, the active area of the respective compression chambers and are dividing by an intermediate horizontal flat partition in two sub-chambers: the lower or suction sub-chambers and the upper ones or compression sub-chambers.

The roofs of the compression chambers are preferably, gradually and stepwise increased, with the roof of the first stage to be lower than that of the second, and the second lower than that of the third and so on.

The compression chambers as well as the collection chambers are enclosed externally by a preferably common cylindrical housing, the height of which is preferably not uniform as it follows the height of the roofs of the respective compression chambers.

Inside the compression chambers rotate the vanes mounted on a cylindrical rotor which rotates freely inside an inner sleeve-cylinder of small diameter and terminates (the rotor) in a vertical shaft by which it is driven. The surfaces of the vanes are progressively increasing and correspond to the cross-sections of the compression chambers.

The shaft exits from the main area of the stages and terminates in a toothed wheel (pinion) which connects it to the transmission systems of the reciprocating-rotational drive systems preferably located at the base of the unit.

The suction sub-chambers of the two collection chambers of each stage communicate directly with the underlying evaporation chamber of the respective stage through their bottoms which are identical or independent surfaces but in contact with the roof of the respective evaporation chamber of the stage and remains permanently open over the droplet separators.

Both suction and compression sub-chambers communicate with the respective compression chambers through the suction and compression check-valves respectively.

The check-valves are activated automatically, preferably by varying the pressures in the compression chambers. The compressor of this variant, because it sucks directly from the underlying evaporation chamber, does not necessarily have a suction pre-chamber as in other applications (e.g. MVC-MEE/MED).

Just below the evaporation chambers and having approximately the same plan-view circular-section area, are developed the respective four condensation chambers with the water-vapor heat-exchangers and are connected, in order for the superheated vapor to be transferred, with the overlying compression chambers of the stage through vertical ducts. The water-vapor heat-exchangers are connected in series and pre-heat the feed-water before it enters the unit and the evaporation chamber of the first and warmest stage.

The compressor creates a lower pressure in the suction sub-chambers, sucks the saturated vapors from the respective underlying evaporation chambers, compresses and superheats them to a specific, for each stage, temperature and finally directs them through the vertical ducts to the condensation chambers with the heat-exchangers for pre-heating the feed-water.

The same rotary-radial compressor, but with suction pre-chambers at its base instead, is also applied to multi-effect evaporation/desalination units (MVC-MEE/MED), where:

As far as the evaporation chambers are concerned, around the narrow inner cylindrical sleeve shaped for the passing of the rotation rotor/shaft, an intermediate spacious vertical duct riser develops, terminating at the roof of the evaporation chambers.

The evaporation chambers, in the MVC-MEE/MED application, are of complex form with water-vapor heat-exchangers consisting preferably of bundles of vertical falling-film tubes. They are covered both from above and below by horizontal flat frontal plates (tube sheets) and internally and circumferentially from the intermediate vertical duct riser which isolates the spaces of the evaporation's saturated vapors from the spaces of the compression's superheated vapors.

Externally and circumferentially the heat-exchangers are open in order for the superheated vapor to descend from the compression chambers into the channel, which develops at the periphery of the evaporation chambers and to access the spaces of the heat-exchangers.

Within the differences, is included the brine pumping system, that pump the brine from the bottom of the evaporation chambers and spray it inside the vertical tubes, outside of which the superheated vapor flows.

The vapor is condensed to desalinated water, portion of the brine is evaporated and the saturated vapor produced descends to the bottom where, due to the lower pressure created in the suction pre-chamber, it rises again through the intermediate vertical riser duct and enters the compression chamber.

There, it is compressed, its temperature rises and is directed downwards again as superheated vapor to the above-mentioned water-vapor heat-exchanger of the stage, etc. The brine which has not evaporated is transferred to the next stage to undergo a corresponding independent process.

In another variation of MVC-MEE/MED the same rotary-radial compressor is used with the following differences:

(a) at the four evaporation chambers which are parallelepipeds and are arranged in pairs and in two parallel rows and (b) at the vapor-water heat-exchangers inside the evaporation chambers consisting of a bundle of horizontal tubes.

The bundle of tubes terminates in two narrow vertical collectors/chambers, the inlet collectors of the superheated vapor, and the outlet collectors of the condensate, both extending over the entire width of the stage.

On top of the heat-exchangers there is a brine spraying system, while in the lower part, the brine basin is developed.

Between the inlet collectors of the superheated vapor and the wall with which the stages are joined in pairs frontally to each other, a narrow flattened vertical duct-chamber develops, extending parallel to the inlet collector of the superheated vapor connecting the brine basin to the compressor's suction pre-chamber, corresponding to the stage.

From the center of the system, i.e. the junction of the four parallelepiped stages, the cylindrical shell-sleeve passes through with the rotation shaft at its center and the rotary-radial compressor at its top.

The double opposite compression sub-chambers of the compressor are connected to the inlet collectors of the heat-exchangers of the superheated vapor through ducts, that terminate on the two opposite sides on the top of the inlet collectors, discharging the superheated vapor from two opposite points.

The operation of this variation is similar to all MVC-MEE/MED applications. The brine is pumped from the bottom of the evaporation chamber and is sprayed externally onto the bundle of the horizontal tubes of the heat-exchangers and the saturated vapor is sucked, compressed, etc., as per known in the MVC-MEE/MED applications.

The stages/effects in all MVC-MEE/MED applications are independent from each other with respect to the medium that provides the energy of evaporation, since the vapor-medium comes from the stage/effect itself, unlike the state-of-the-art of purely thermal systems MEE/MED (as well as MVC-MEE/MED), where the vapor-medium and the thermal energy of evaporation of each stage, are derived from the previous and warmer stage.

In another embodiment of multi-stage flash evaporation desalination with Mechanical Vapor re-Compression (MVC-MSF) the reciprocating positive displacement, dual-action compressor, differs as it is comprised of cylindrical compression chambers sequentially and in series arranged and carries corresponding circular vanes.

The vanes are mounted to a common horizontal shaft perpendicular to their surface that moves reciprocally and linearly by a drive mechanism. The evaporation chambers, like the condensation and heat-exchanger chambers, are arranged linearly instead of radially. The surfaces of the vanes as well as the volumes of the respective cylindrical compression chambers are also preferably gradually and stepwise increased.

There are also present the relevant suction and compression check-valves of the compressor as well as the suction and compression ducts which communicate with the evaporation chambers for the suction of the saturated vapors and with the condensation chambers and heat-exchangers to pre-heat the feed-water as described at the Flash Evaporation Desalination (MVC-MSF).

The ratio of compression (CR) of vapor volumes, as well as the temperature rise, are also adjustable attributes here, and the operation of the new application is completely analogous to what has already been described in the MVC-MSF with rotary-radial compressors.

The system can also function as a multi-stage compressor where a chamber sucks from the former and re-compresses the pumped medium to the next by gradually increasing the pressure from stage to stage. It can also be used as a multi-stage compressor in refrigeration applications or as a multi-stage compressor of any gaseous medium.

DESCRIPTION OF THE DRAWINGS

FIG. 7 shows a schematic illustration of a multi-cylindrical chambers compressor of reciprocating-linear motion.

FIGS. 13, 14 show the cross-sections 13-13, 14-14 of an embodiment of a Multi-Stage Flash Evaporation (MVC-MSF) with the multi-cylindrical chambers compressor, of reciprocating-linear motion of FIG. 7.

FIG. 15 shows a schematic illustration of the multi-cylindrical chambers' compressor of reciprocating-linear motion of FIGS. 13, 14.

DETAILED DESCRIPTION OF THE INVENTION

Figure 1:
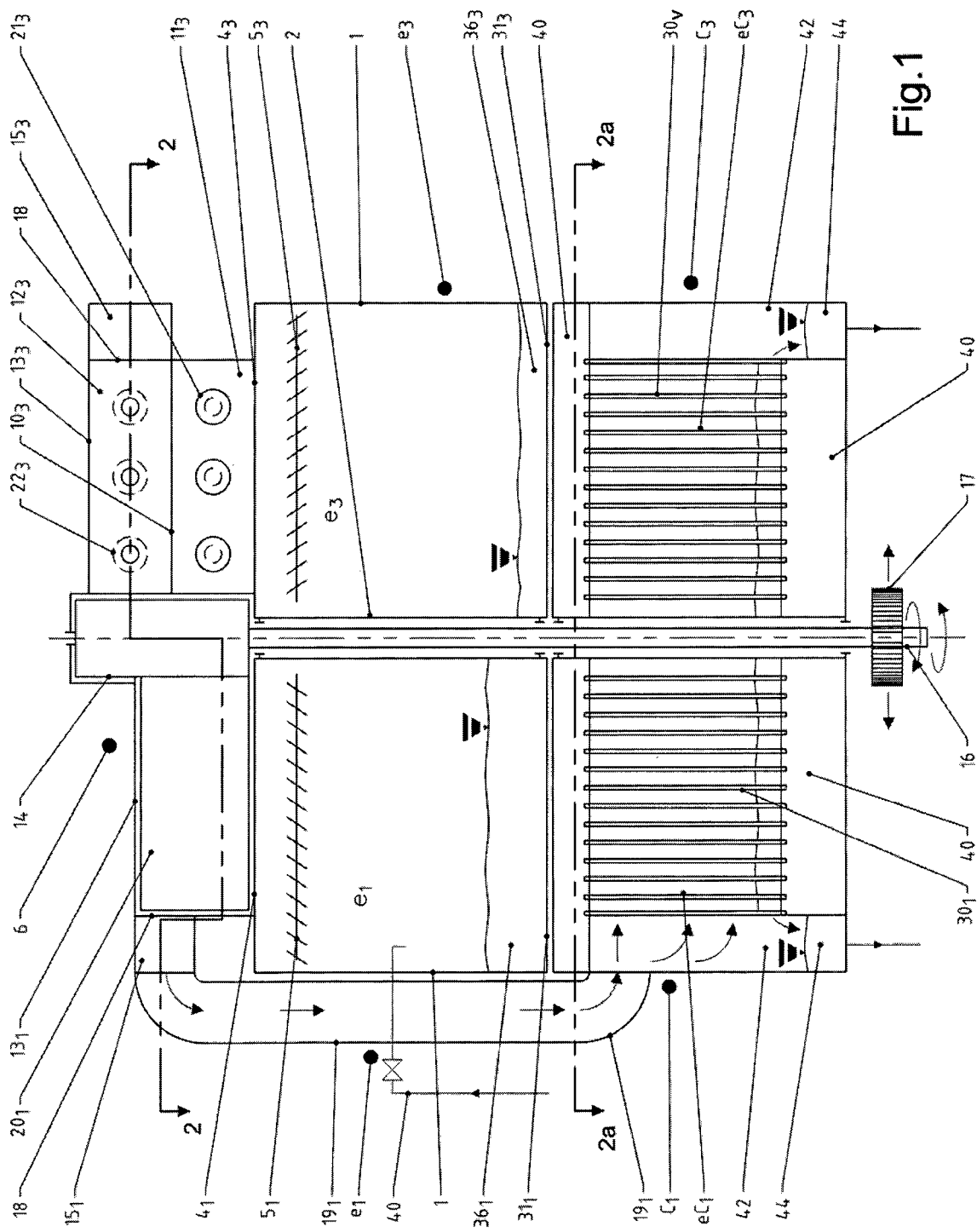
FIG. 1 shows the cross-section 1-1 of a four-stage MVC-MSF reciprocating positive displacement, rotary-radial, dual-action multi-chamber compressor, with a water-vapor condenser/heat-exchanger of vertical tubes.
Figure 2:
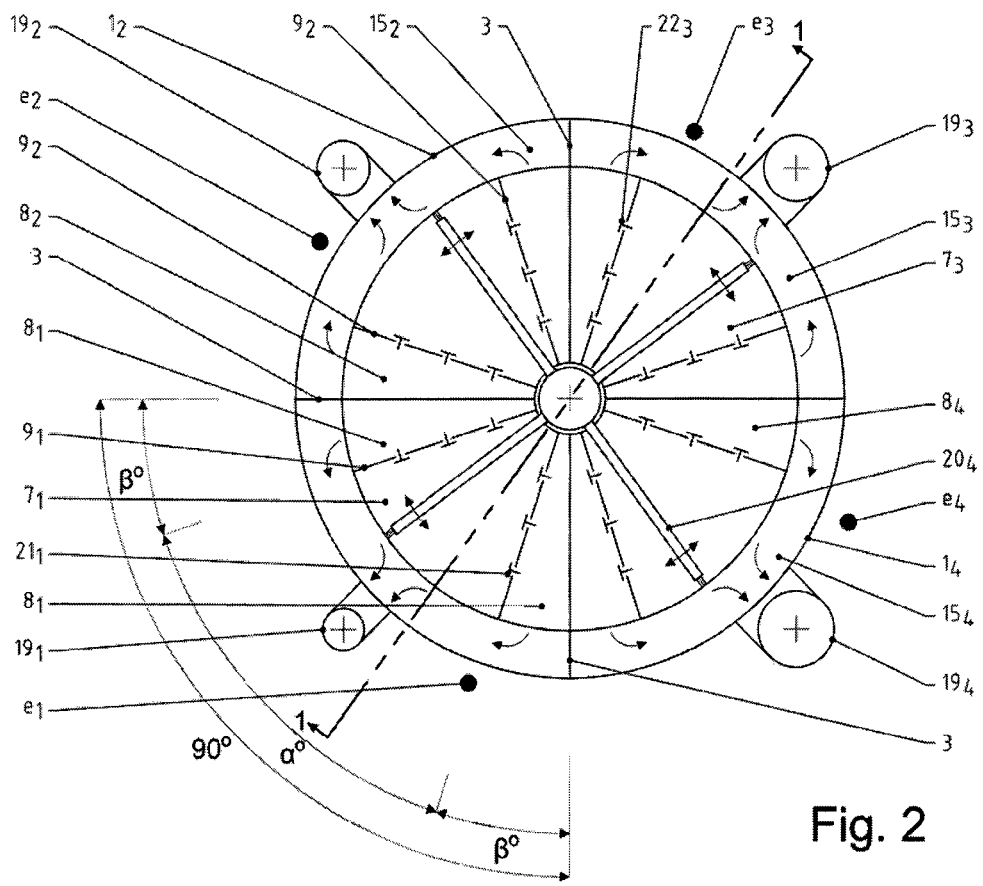
FIG. 2 shows the cross-section 2-2 of the embodiment of FIG. 1 disclosing the compression chambers.
Figure 2A:
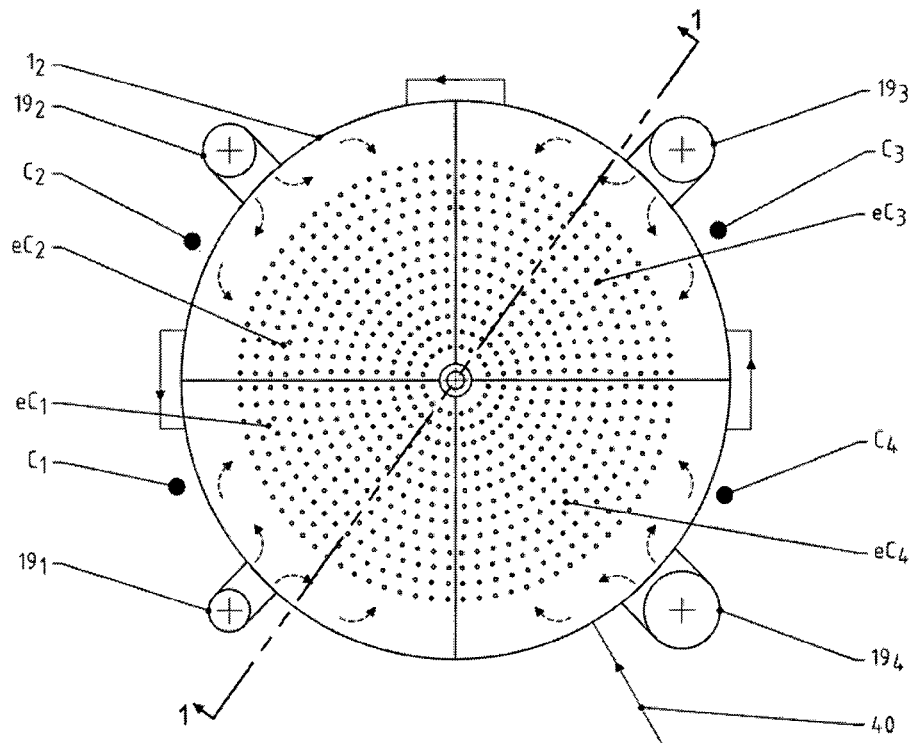
FIG. 2a shows the cross-section 2a-2a of the water-vapor condenser/heat-exchanger of vertical tubes of the embodiment of FIG. 1.

FIGS. 1, 2, 2a show the cross-sections 1-1, 2-2 and 2a-2a respectively of compact four-stage Flash Evaporation Desalination with Mechanical Vapor re-Compression (MVC-MSF).

The unit is enclosed by two coaxial cylindrical shells, an outer shell 1 and an of smaller diameter inner sleeve-cylinder 2, between of which the four radially arranged evaporation chambers $e_v$ (e1, e2, e3, e4) of the respective stages are developed, which are laterally separated from each other by the four crosswise arranged vertical spacers $3_v$ ($3_1$-$3_4$).

The roofs of the evaporation chambers of the four stages-segments are covered by a common and uniform, preferably horizontal, airtight roof cover $4_v$ ($4_1$-$4_4$) below of which are developed the respective droplet separators $5_v$ ($5_1$-$5_4$) for holding the droplets of brine.

The bottoms $31_v$ ($31_1$-$31_4$) as well as the roof covers $4_v$ of the evaporation chambers of all stages are preferably for all stages a common and uniform circular horizontal plane divided into four circular sectors.

On to the roofs covers $4_v$ of the evaporation chambers is located the compressor 6 with the four compression chambers $7_v$ which are radially arranged above the evaporation chambers $e_v$ corresponding one by one to them.

Similarly to the evaporation chambers $e_v$, the compression chambers $7_v$ are separated by the same vertical spacers $3_v$ extending upwards.

Inside the compression chambers $7_v$, at both ends of them and in contact with the vertical spacers $3_v$, are developed two for each compression chamber identical, narrow, opposite facing, collection chambers $8_v$ ($8_1$-$8_4$) which are restricted laterally, internally by two also radially arranged vertical spacers $9_v$ ($9_1$-$9_4$) which extend over the entire height of the compression chamber $7_v$, and externally by the radial vertical crosswise arranged spacers $3_v$ of the respective stage.

All collection chambers $8_v$ are cylindrical sectors extending at the same, for all the stages, area corresponding to the central angle β° and are restricted circumferentially and internally by the inner sleeve-cylinder 2 of smaller diameter. The two inward facing vertical spacers $9_v$ are extending, in the present application of the four-stage version, at a central angle α°=90°−2*β° and restrict the active area of the compression chambers $7_v$ and respectively the range/stroke of the reciprocating-rotational motion of the vanes $20_v$ ($20_1$-$20_4$). The compression chambers are cylindrical sectors based on circular sectors of the same central angle 90° (=α°+2*β°).

The collection chambers $8_v$ are also divided by intermediate horizontal flat partitions $10_v$ ($10_1$-$10_4$) into two smaller chambers: the lower or suction sub-chambers $11_v$ ($11_1$-$11_4$) and the upper or compression sub-chambers $12_v$ ($12_1$-$12_4$).

Roofs/covers $13_v$ ($13_1$-$13_4$) of the compression chambers $7_v$ (as well as of the corresponding collection chambers $8_v$) show preferably a gradual and stepwise increase in the height, with the roof $13_1$ of the first stage being lower than the corresponding $13_2$ of the second and the second lower than the third, etc.

The compression chambers $7_v$ are encircled externally by a preferably, common for all stages, cylindrical housing 18 the height of which varies gradually stepwise and follows the height of the roofs $13_v$ of the respective compression chambers $7_v$.

The roofs $13_v$ also form the upper cover of the compact four-stage unit. Inside the four compression chambers $7_v$, move the radially arranged flat vanes $20_v$ ($20_1$-$20_4$) of the rotor 14 of the compressor 6, projecting through the permanently open openings $122_v$ of the sleeve-cylinder 2 as will be described below.

The two opposite facing suction sub-chambers $11_v$ of the two collection chambers of each stage, communicate with the underlying evaporation chamber $e_v$ of the respective stage through their bottom which is identical to the roof $4_v$ of the evaporation chamber of the respective stage and which remains permanently open above the droplet separators $5_v$.

Both suction sub-chambers $11_v$ and compression sub-chamber $12_v$, communicate with the respective compression chambers $7_v$ of the compressor 6 of their stage, through suction and compression check-valves $22_v$ ($22_1$-$22_4$) and $21_v$ ($21_1$-$21_4$) respectively. The valves operate automatically and preferably by varying of the pressures in the respective compression chambers.

Evaporation chambers are empty spaces and do not contain any heat-exchangers. Just below the evaporation chambers $e_v$, and with almost the same circular-sector plan-view, are developed the respective four condensation chambers $C_v$ ($C_1$-$C_4$) with the water-vapor heat-exchangers $eC_v$ ($eC_1$-$eC_4$), which are preferably comprised of vertical tubes $30_v$ ($30_1$-$30_4$) and are connected to the compression chambers $7_v$ of the above lying compressor of the stage through the vertical ducts $19_v$ of the superheated vapor. The heat-exchangers $eC_v$ pre-heat the feed-water 40 before it enters the system.

Figure 3:
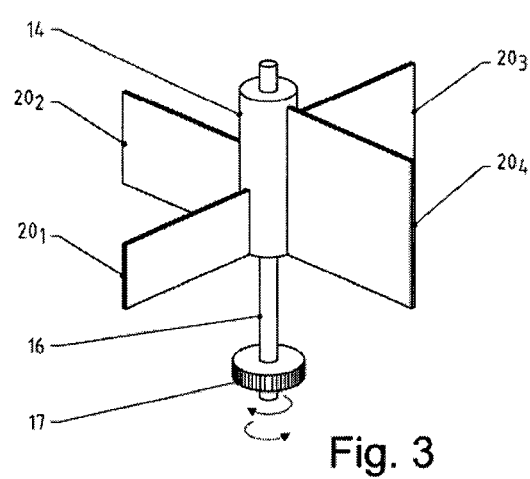
FIG. 3 shows the rotor of the compressor with four vanes.

In FIG. 3, are shown the four vanes $20_v$ and the rotor 14 of the compressor 6. The vanes $20_v$ are mounted in various ways along a vertical edge onto the cylindrical rotor 14 rotating freely within the narrow sleeve-cylinder 2.

The surfaces of the four vanes $20_v$ ($20_1$-$20_4$) preferably differ from one another as they progressively increase corresponding to the cross-sections of the four compression chambers $7_v$ within of which they are rotated. The rotor 14 terminates on a vertical shaft 16 that exits the main body of the stages and the sleeve-cylinder 2 and terminates on a toothed wheel (pinion) 17 which connects it to the reciprocating-rotary drive transmission systems.

Figure 3A:
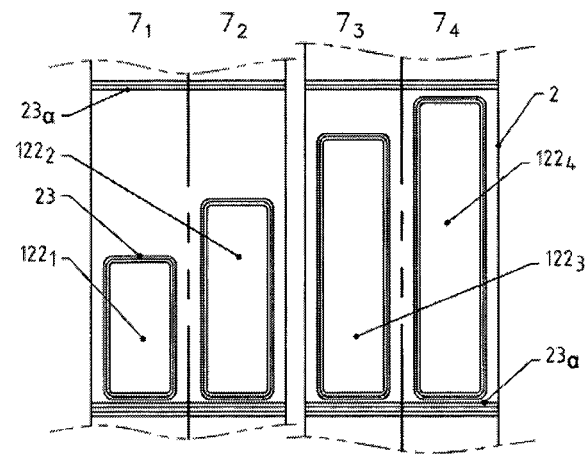
FIG. 3a shows an exploded view of the inner side of the inner narrow sleeve-cylinder of the compressor and a sealing embodiment of the reciprocating-rotary motion of the rotor.

FIG. 3a shows a exploded view of the inner side of the inner sleeve-cylinder 2 which is also the inner cylindrical wall of the compression chambers $7_v$ of the compressor 6 through which the rotor 14 and the shaft 16 pass.

It concerns an embodiment of sealing the rotation of the rotor between the adjacent compression chambers $7_v$ by sealing the openings $122_v$ within of which the vanes $20_v$ move/stroke. the openings $122_v$ within of which the vanes $20_v$ move/stroke. The sealing is a series of concentric closed frames of horizontal and vertical bars 23 projecting slightly around the openings $122_v$ on the inner cylindrical surface of the sleeve-cylinder 2 creating between them the peripheral channels and the labyrinth conditions of trapping the vapor.

Correspondingly, there are also the parallel rows of rolled bars 23a circumferentially and sequentially arranged below and above the openings $122_v$. The bars 23a also cooperate with respective equal number of parallel rows of rolled bars 23b deployed on the opposed convex portion of the rotor 14 and are interposed one by one between the bars 23a, creating a double labyrinth seal (the latter is e.g. applicable to compression chambers' version of FIG. 3d, with prefabrication capability). The rolled bars 23b are not designed.

At the top of the inner sleeve-cylinder 2, around the upper-end and right before the top bearing of the shaft 16, there is also an auxiliary water-vapor heat-exchanger for the additional pre-heating of a portion of the feed-water 40 on the walls of which the vapor, which escapes from the labyrinth bars, condenses and flows, collected as desalinated water at the bottom of the sleeve-cylinder 2. The heat-exchanger is not designed.

Figure 3C:
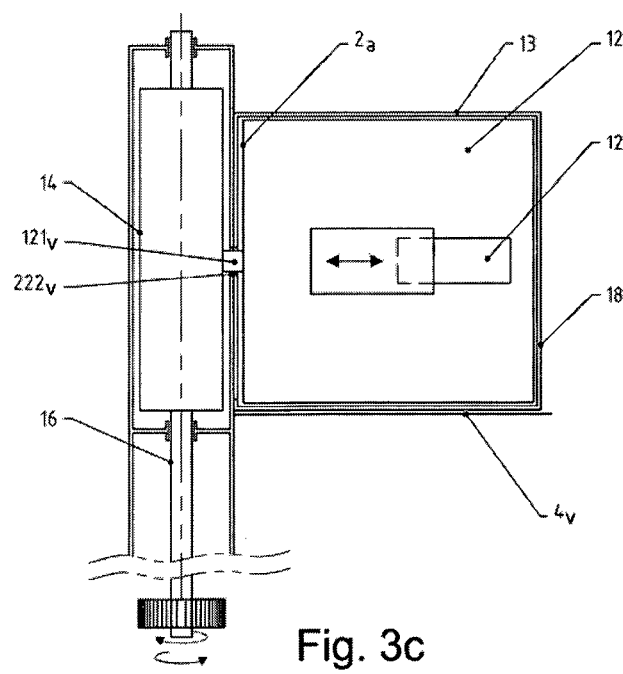
FIG. 3c shows a detail of the mounting of the compressor's vanes at the rotor.
Figure 3B:
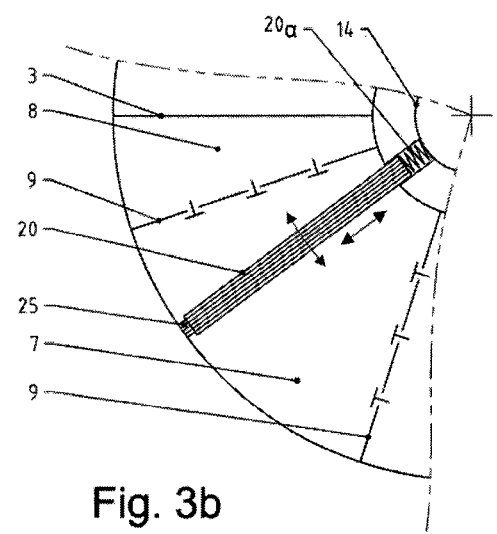
FIG. 3b shows a mounting of the vanes into slots and a sealing embodiment of the edges of the compressor's vanes with labyrinthine vapor traps.

FIG. 3b shows a detail of an embodiment of a mounting of the vanes into slots with compression springs 20a and of a sealing of the vanes' edges 20, with a series of parallel longitudinal bars 25 which extend along all the vanes' edges, which, as in FIG. 3a, creating labyrinth vapor traps between the two sides of the vanes.

Figure 3D:
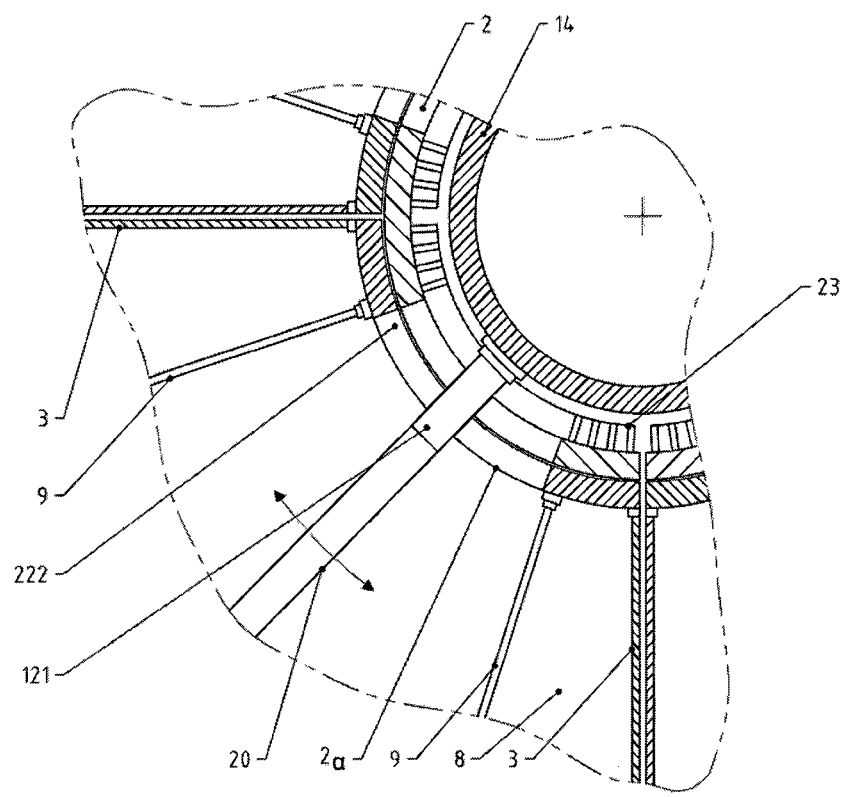
FIG. 3d shows a detail of the inner cylindrical wall of the compression chamber of FIG. 3c with prefabrication capability.

FIGS. 3c, 3d show a variant and a detail of the mounting of the compressor's vanes $120_v$ onto the rotor 14 by a short arm $121_v$ and a variation of the compressor with independent (modular) compression chambers respectively. This variant has the advantage that the openings $222_v$ on the wall of the inner sleeve-cylinder 2 for the exit of the arm $121_v$, are narrow transverse slots and the sealing of the rotary movement therefore more easy and efficient.

In FIG. 3d the inner sleeve-cylinder 2 no longer forms the inner cylindrical wall of the compression chambers $7_v$, but there are interposed opposing coaxial cylindrical wall-portions 2a and in contact with the sleeve-cylinder 2, in order for each compression chamber to be independent and individually closed shape and not directly associated with the sleeve-cylinder 2. In addition, the new wall-portions 2a joined and with the rest covering parts, etc. of the compression chambers makes it easier for both the prefabrication (modules) of the compression chambers as individual parts and the transportation as well as accurate and quick assembly of the compressor unit/housing on-field.

At the center of the vane $120_v$, the adjustable (sliding) aperture $123_v$ (by-pass) exists to adjust the discharge of the compression chamber by by-passing of a portion of the vapor from the high-pressure side in the low-pressure side of the vane, that are continuously alternating.

There might be other mounting and sealing systems of vanes as well as dividing in parts, prefabrication and assembling of the compressor chambers, etc.

Figure 4:
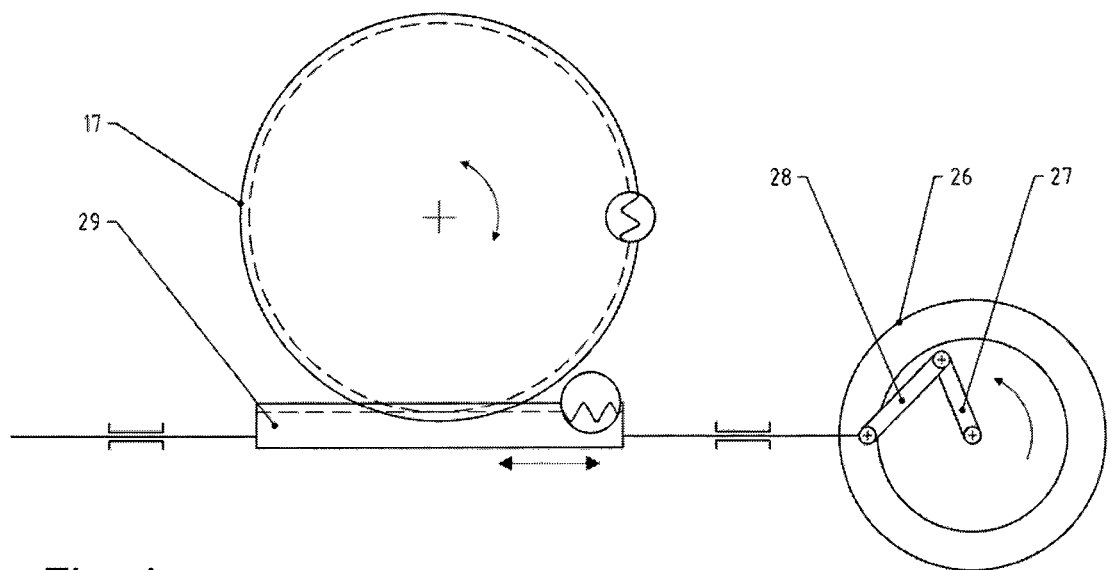
FIG. 4 shows a typical mechanism of reciprocating-rotary motion with a rotary motor, a crankshaft, and a connecting rod.

FIG. 4 shows a typical mechanism of reciprocating-rotary movement preferably achieved by a rotary motor 26, a crankshaft 27 and a connecting rod 28, which converts the rotation into a reciprocating-linear motion which is then converted again into a reciprocating-rotary, by a rack 29 and a pinion 17. However, there might be other reciprocating-rotary drive systems (e.g., special reciprocating-rotary or -linear motion electric motors, etc.).

The main factors of each stage (i.e. compression $7_v$, evaporation $e_v$, condensation $C_v$, and heat-exchangers $eC_v$ chambers) correspond and are located one directly above the other, in such a way that the four stages can be prefabricated as four independent cylindrical sectors (modules) and assembled during installation creating the cylindrical body of the unit. Correspondingly, the vanes and obviously the chambers could be, in particular in the variant of FIGS. 3c, 3d, prefabricated as parts, independently of the rotor and assembled onto the rotor during installation.

What will remain to complete the installation of the unit, is the external connections of the ducts $19_v$ with the condensation chambers $C_v$, and the in-series external hydraulic connections of (a) the heat-exchangers' $eC_v$, (b) the brine and (c) the desalinated water, that will be removed.

The rotary-radial compressor 6, due to its shape and motion, is characterized as a "fan" type.

The reciprocating-rotary motion of the rotor 14 functions as a multi-compressor of four independent compression chambers. Creates a lower pressure at the inlet of the multi-compressor, sucking the vapors from the evaporation chambers $e_v$, and transferring them to the compression chambers $7_v$ where it compresses and superheats them before leading them to the condensation chambers $C_v$. Similar operation with the "supercharger" system of internal combustion engines, hence the significant thermodynamic and technological improvement that the present multi-compressor offers, among other things, in thermal desalination, etc.

The Operation of the Compressor 106 at the MVC-MSF System of FIGS. 1-4

The feed-water 40 is pumped and passed through the multi-stream external heat-exchangers (not designed) where it is pre-heated in the multi-stream heat-exchangers of the desalinated water $44_v$ and the brine $36_v$ which are removed. The pre-heated feed-water 40 enters under pressure from the fourth and coldest stage through the bundle of vertical tubes $30_v$ of the water-vapor heat-exchangers $eC_v$, runs all the stages where it is gradually pre-heated, by the superheated vapors which correspondingly condense, and finally the feed-water enters the evaporation chamber $e_1$ of the first stage. The condensed, desalinated water is collected in the bottom of the condensation chambers $C_v$ and is removed.

Upon entry of the feed-water 40 into the evaporation chamber $e_1$ of the first stage, part of it is subjected to flash evaporation and the vapor produced, in saturation state, is intensively sucked, entering through the permanent openings of the roof cover $4_1$ and passes to the two suction sub-chambers $11_1$ of the double collecting chamber $8_1$ of the first stage after passing through the droplet separators $5_1$.

Whenever the vane $20_1$ of the first stage begins the reciprocating stroke from one of its two terminal positions, which are identical to the two opposed vertical spacers $9_1$, lower pressure is created in the suction sub-chamber $11_1$ of the collecting chamber $8_1$ behind the vane.

The lower pressure opens the suction check-valves $21_1$ and the vapor enters at high speed into the compression chamber $7_1$ of the first stage of the compressor, following the vane's $20_1$ motion. The intense suction reduces the vapor pressure in the evaporation chamber $e_1$ and causes more intensive evaporation.

After the stroke of the vane $20_1$ and the suction phase have been completed, the vane $20_1$ moves in the opposite direction. Part of the compression chamber $7_1$, which was previously under lower pressure conditions, is now at higher pressure conditions, the suction check-valves $21_1$ close behind it, while at a certain point on the new stroke and when the required high pressure has been reached, the compression check-valves $20_1$ open-up at the opposite (in the vane movement) compression sub-chamber $12_1$. Due to the dual-action of the vane, vapors are sucked and compressed continuously.

With the compression, the vapor temperature rises and superheated and under considerable higher pressure is guided through the permanent opening of the compression sub-chamber $12_1$ in the peripheral channel $15_1$ and from there through the common vertical duct $19_1$, of the first stage, descends into the condensation chamber $C_1$ and the water-vapor pre-heating exchangers $eC_1$ of the feed-water 40.

The superheated vapor transfers its sensible and latent heat to pre-heat the feed-water 40 and condenses on the outer surfaces of the tubes $30_1$ of the heat-exchanger, while the condensate $44_1$ descends to the circumferential channel $42_1$ at the bottom of the chamber $C_1$ of the first stage.

The brine portion $36_1$ which is not evaporated in the first stage, has lost temperature and from the bottom of the evaporation chamber $e_1$ is fed to the next evaporation chamber $e_2$ of the second stage. Herein the same flash evaporation process and compression of the vapors is followed, with the exception that since the brine $36_2$ is colder and the vapor pressure lower, the vacuum at this stage is higher.

Furthermore, because the specific enthalpy (kJ/kg) is reduced while the specific volume (m³/kg) of the saturated vapor is greater, the circulation of a larger volume is required in order to have the same production as the first stage.

For this reason the surface of the vane $20_2$ is larger. Therefore, the suction volume, the compression ratio (CR) and the rise in the vapor temperature, have different values compared to the first stage.

The process is repeated in the third and fourth (last) stage with the surface of the vanes $20_v$ being gradually increased, the brine $36_v$ circulating and becoming colder and more saline and the temperature of the compressed vapors also gradually decreasing.

The feed-water 40, following a reverse course in regards to the brine, is pre-heated gradually in the heat-exchangers $eC_v$ which are connected in-series, so that the temperature $t_a$ (corresponding to the boiling temperature of the brine $36_1$ of the first stage) is finally reached before entering the first stage.

The desalinated water, by following the reverse direction relative to the feed-water, is collected and removed after it has passed through the multi-stream external water-water heat-exchanger of the initial pre-heating of the feed-water 40.

In order for the flow of the brine and the desalinated water to be moved preferably by gravity, the levels of the bottoms $31_v$ of the evaporation chambers may be gradually stepped. Also, the volumes of the evaporation chamber $e_v$, of the condensation chambers $C_v$, as well as the surfaces of the water-vapor heat-exchangers $eC_v$, may not be the same, but they change gradually from stage to stage.

Figure 6:
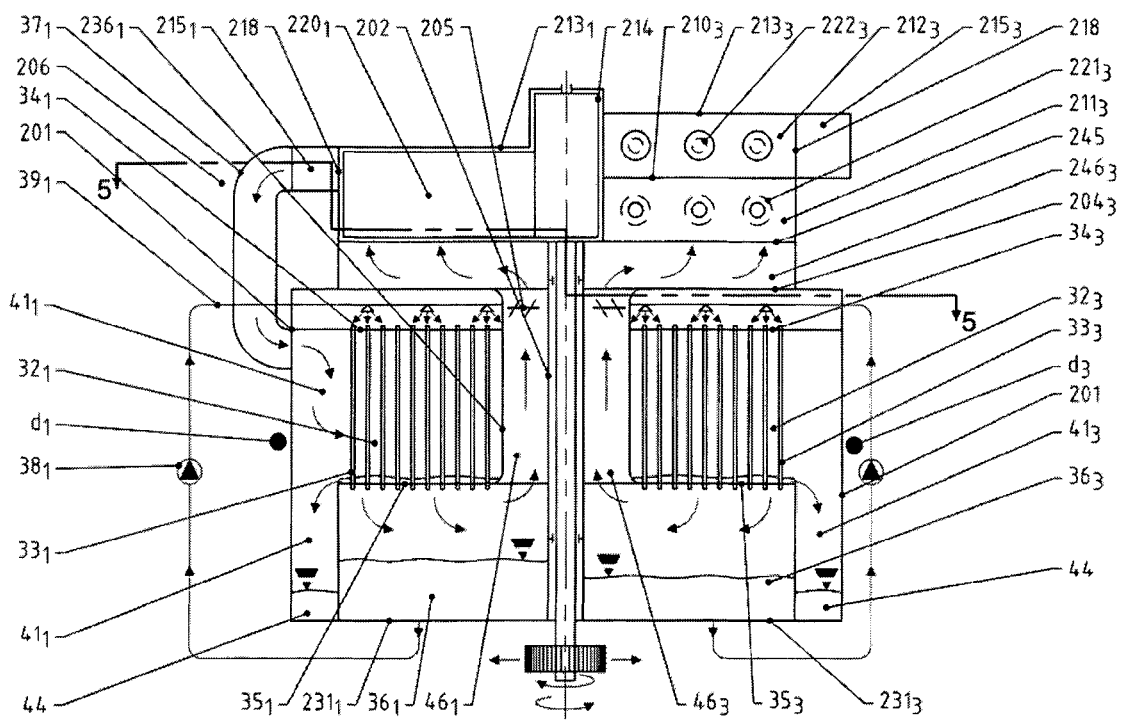
FIGS. 5, 6 show the cross-sections 5-5, 6-6 of an embodiment of the Multi-Effect Evaporation (MVC-MEE/MED) with a rotary-radial, reciprocating, dual-action compressor.
Figure 5:
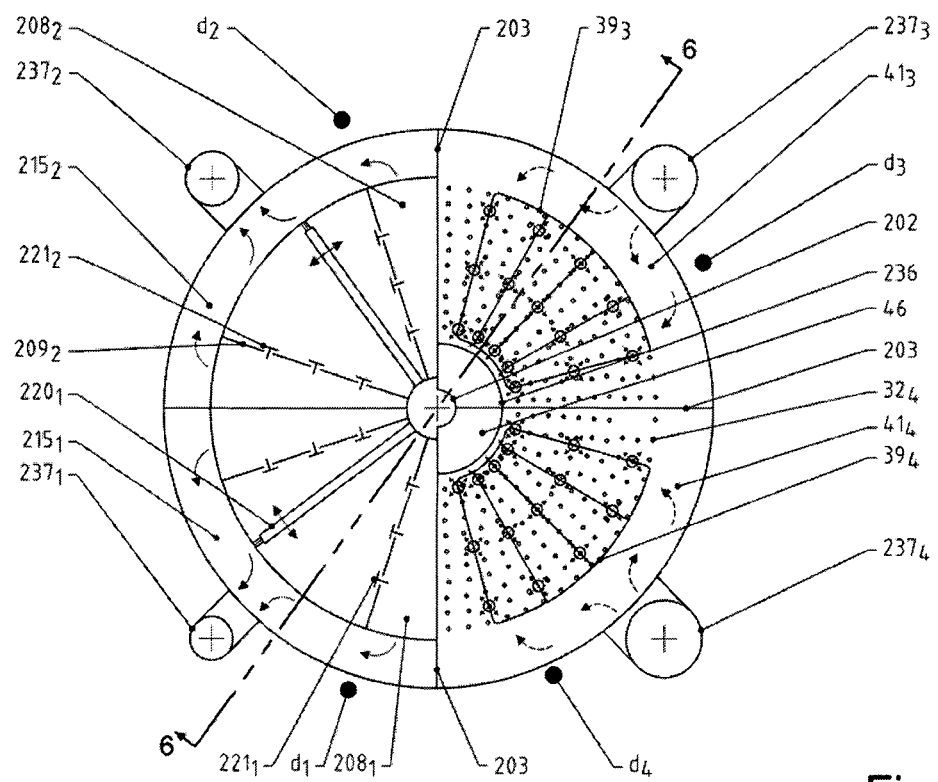

FIGS. 5, 6 show the cross-sections 5-5, 6-6 of a Multi-stage Evaporation Desalination MVC-MEE/MED with a, reciprocating-rotary and dual-action rotary-radial compressor.

This application of the four-stage unit resembles that of FIGS. 1-4 of MVC-MSF in the following points:

They have the same rotary-radial compressor 206 with the vanes $220_v$, the rotor 214, the collection chambers $208_v$, the vertical spacers $203_v$ and $209_v$, the horizontal flat partitions $210_v$ in the sub-chambers $211_v$ and $212_v$ with the respective suction and compression check-valves $221_v$ and $222_v$ and the circumferential channel $215_v$. Finally, the compression chambers $207_v$, with the flat roofs $213_v$ of gradually and stepwise increased heights and the cylindrical housing 218, complement the compressor 206.

The unit has the same radial arrangement of the evaporation chambers $d_v$ with the common roof cover $204_v$, the peripheral cylindrical shell 201, the inner sleeve-cylinder 202, with the bases of the chambers $d_v$ occupying the four circular bottom segments 231.

With regard to the differences with the aforementioned variation MVC-MSF of FIGS. 1-4:

Regarding the evaporation chambers $d_v$ ($d_1$-$d_4$), between the peripheral cylindrical shell 201 and the narrow inner sleeve-cylinder 202, is interposed a larger coaxial cylindrical shell $236_v$. Between the latter cylindrical shell $236_v$ and the sleeve-cylinder 202, an intermediate vertical duct riser $46_v$ is formed, terminating at the top of the roofs $204_v$.

The evaporation chambers $d_v$ contain heat-exchangers $32_v$, preferably water-vapor, consisting of vertical tube bundles $33_v$ of falling brine film. They are developed within the chambers $d_v$ and are covered from top and bottom by horizontal flat frontal plates (tube sheets) $34_v$ and $35_v$ respectively and internally peripherally from the large cylindrical shell $236_v$.

The flat frontal plates (tube sheets) $34_v$ and $35_v$ and the cylindrical shell $236_v$ isolate the spaces of the saturated vapor, from the spaces of the superheated one. Externally and peripherally, the heat-exchangers $32_v$ are open in order for the superheated vapor, descending from the compression chambers $207_v$, to access the spaces of the heat-exchangers $32_v$.

The superheated vapors, from the peripheral channel $215_v$ of the compressor and through the vertical ducts $37_v$, end up in the troughs $41_v$ which develop at the periphery of the evaporation chambers $d_v$ and from there in the space of the heat-exchangers $32_v$.

Regarding the compressor, between the roofs $204_v$ of the evaporation chambers $d_v$ and the compression chambers $207_v$ are developed four suction pre-chambers $246_v$ ($246_1$-$246_4$) which are located below their respective compression chambers $207_v$ (and bellow their collection chambers $208_v$). The suction pre-chambers correspond exactly to the compression chambers and are also an integral part of the compressor's housing, occupying the entire circular surface under it and are peripherally enclosed by the common cylindrical housing 218.

At the upper-end of the vertical duct $46_v$, inside the evaporation chamber and before the suction pre-chambers $246_v$, brine droplets separators $205_v$ are developed.

Within the differences are included the pumping system $36_v$ of the brine which pumps the brine from the bottom of the evaporation chambers $d_v$ by the pumps $38_v$ and sprays it through the spray/nozzle systems $39_v$ onto the flat frontal plates (tube sheets) $35_v$ in the upper portion of the evaporation chambers and above the bundle of the vertical tubes $33_v$ of the water-vapor heat-exchangers $32_v$. The surfaces of the heat-exchangers are gradually changed from stage to stage.

Figure 8A:
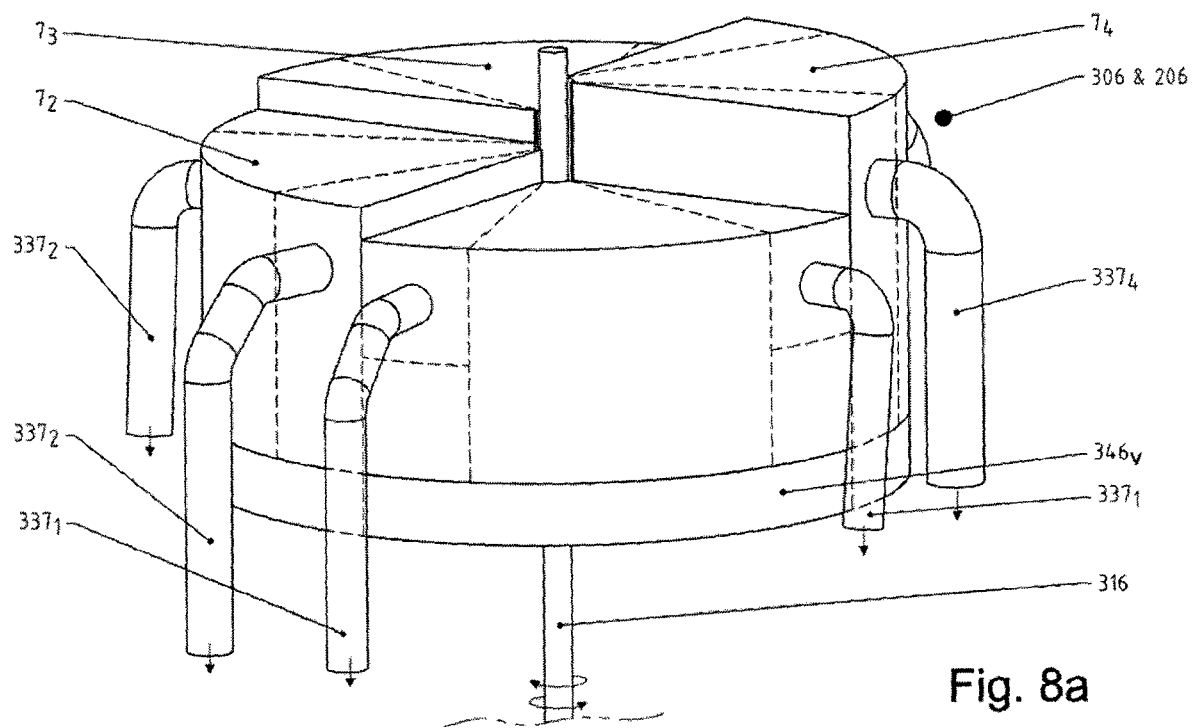
FIGS. 8a, 8b show the complete rotary-radial compressor with suction pre-chambers and a typical compression chamber.
Figure 8B:
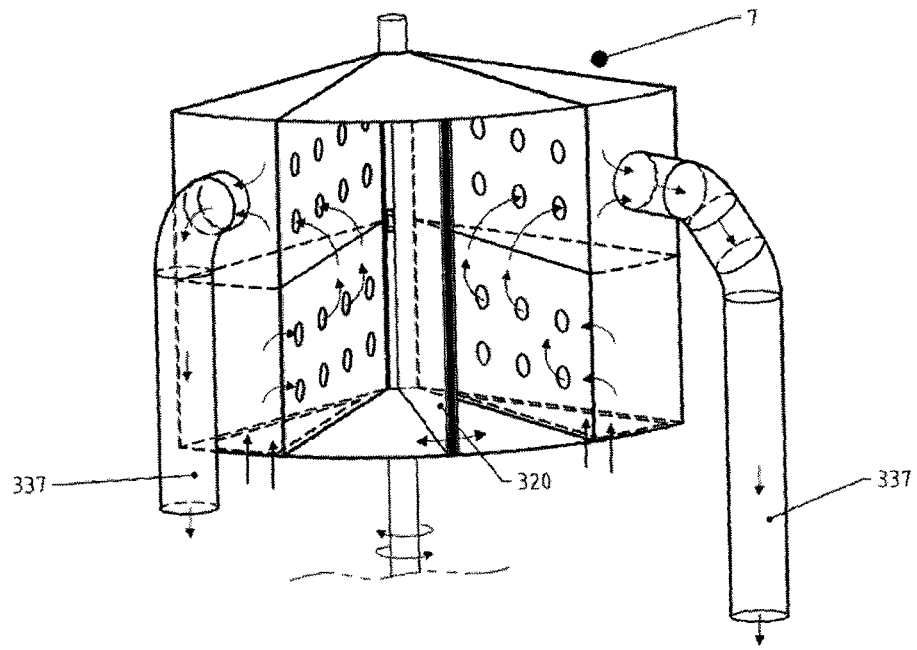
Figure 9:
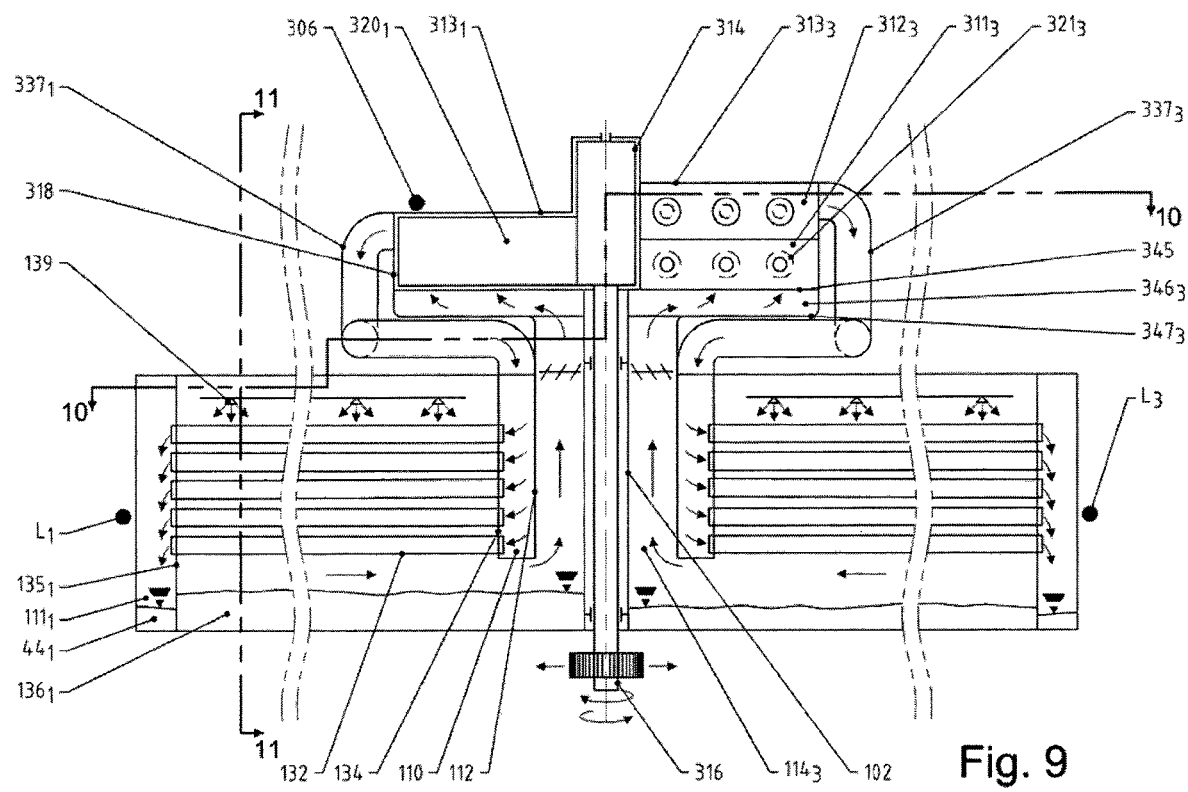
FIGS. 9, 10, 11, 12 show the cross-sections 9-9, 10-10, 11-11, 12-12 of a MVC-MEE/MED four-stage/effect desalination system with a rotary-radial compressor, with parallelepiped evaporation chambers arranged in pairs, in two parallel rows and in contact to each other.
Figure 10:
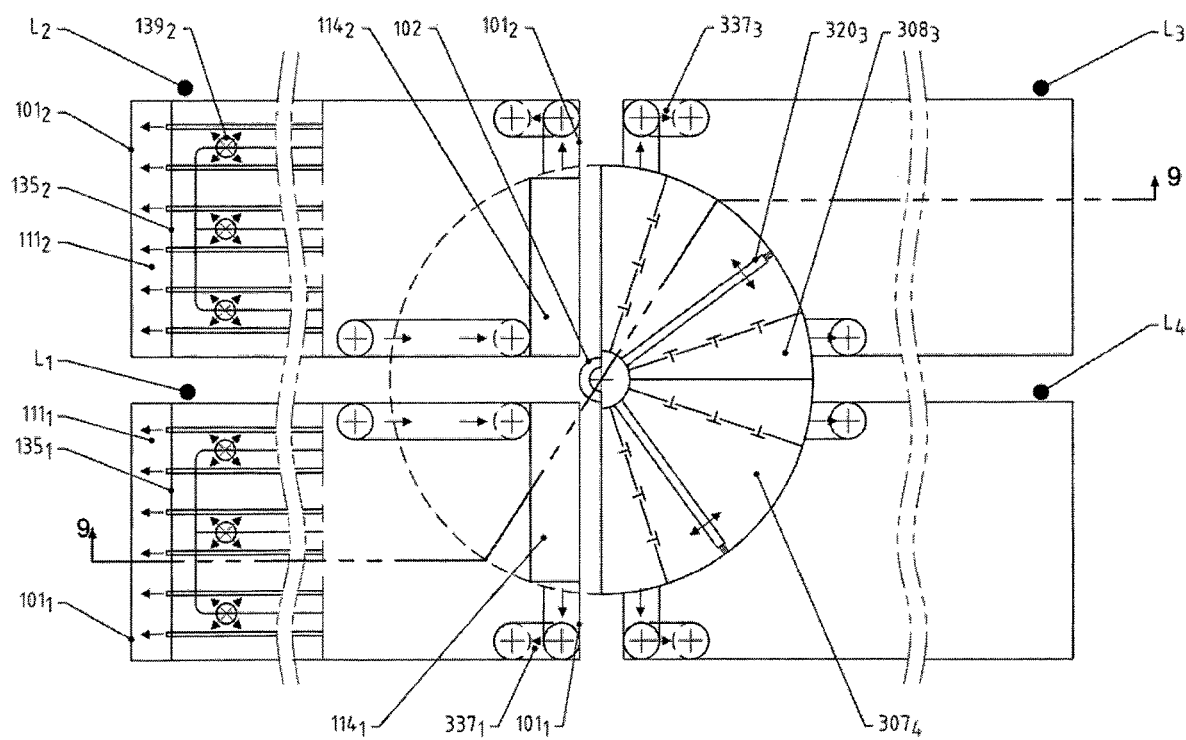
Figure 11:
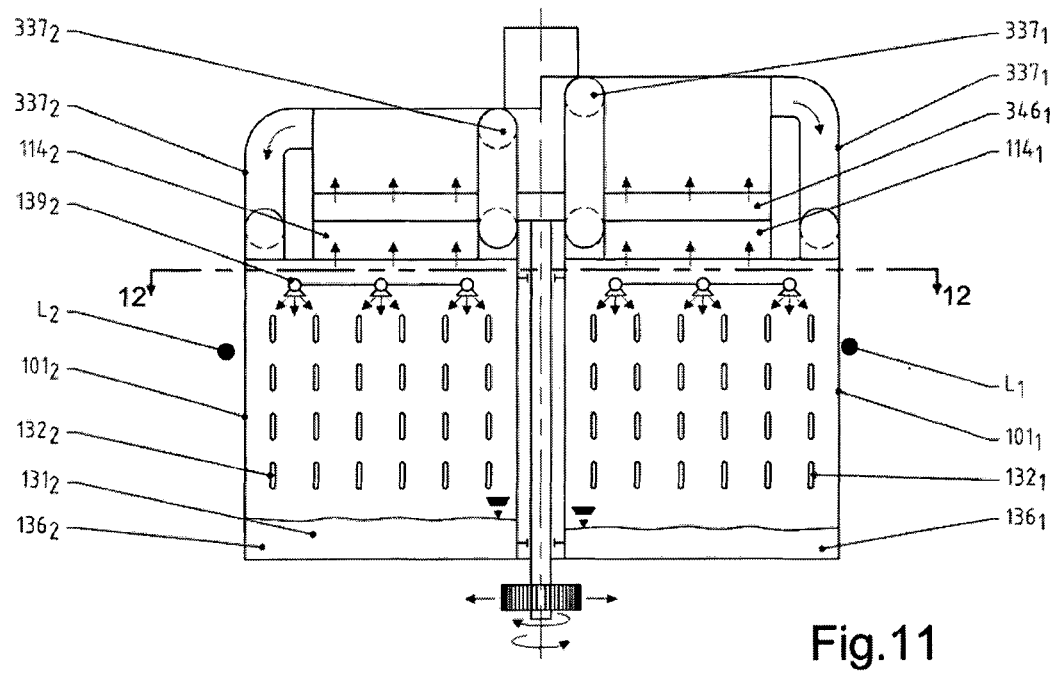
Figure 12:
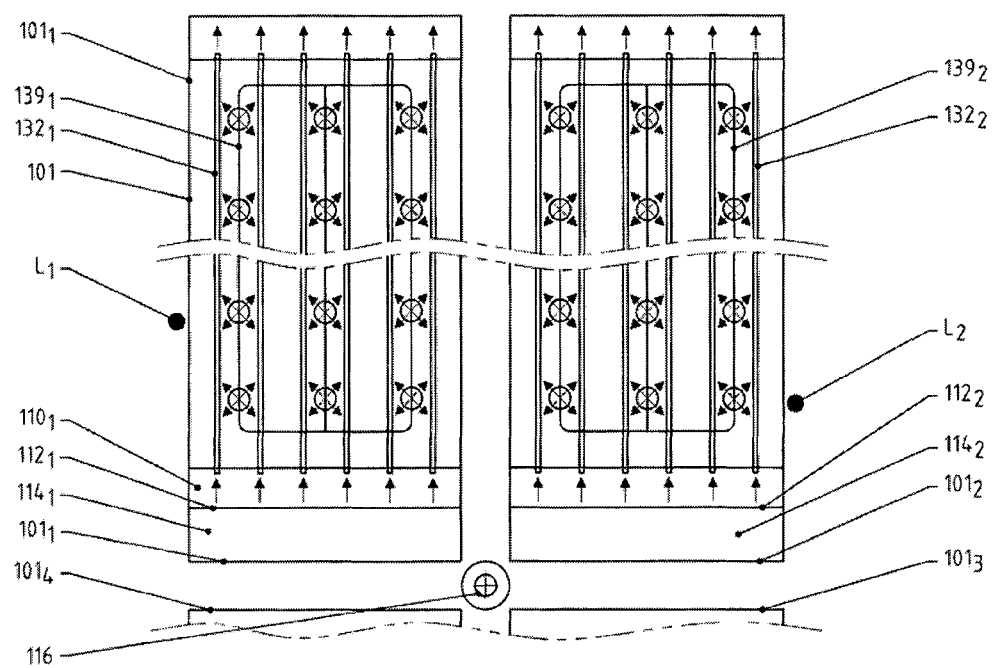

The FIGS. 8a, 8b show the rotary-radial compressor 306 with suction pre-chambers $346_v$ and a typical compression chamber respectively.

The Operation of the Compressor 206 and of the System MVC-MEE/MED

The feed-water 40 is pumped at ambient temperature, is pre-heated at the specific temperature $t_o$ in the multi-stream external heat-exchanger (not designed) from the removed brine $36_v$ and the desalinated water $44_v$ and is fed to the evaporation chamber $d_1$ of the first stage.

The inlet temperature $t_o$ is slightly lower than the temperature $t_1$ of the boiling point of the brine which corresponds to the specific vacuum prevailing in the evaporation chamber $d_1$ of the first stage.

From the bottom of the chamber $d_1$, the brine $36_1$ is sucked by pump $38_1$ and sprayed through the spray system $39_1$ at the inner surfaces of the falling film tubes $33_1$ of the water-vapor heat-exchanger $32_1$, wherein a portion of the brine is evaporated by the sensible and latent heat transferred by the superheated vapor $S_1$ flowing onto the outer surfaces of the tubes $33_1$. In particular:

Whenever the vane $220_1$ of the first stage of the compressor 206 begins the reciprocating stroke from one of the two of its terminal positions, as per known, lower pressure is created in the suction sub-chamber $211_1$ of the collection chamber $208_1$ which happens to be behind the vane.

The lower pressure opens the suction check-valve $221_1$ and the saturated vapor produced in the evaporation chamber $d_1$ is strongly sucked following the stroke of the vane, enters the suction sub-chamber $211_1$ of the collection chamber $208_1$ of the first stage, after having ascended through the vertical duct $46_1$, having dismissed the brine droplets at the separator 205 and having entered in the suction pre-chamber $246_1$ of the compressor.

After the vane's stroke $220_1$ and the suction phase have been completed, the vane $220_1$ moves in the reverse direction, as per known from the previous embodiment of the FIGS. 1-4.

The compression ratio $CR_1$ corresponds to the required temperature rise of the superheated vapor of the first stage. The saturated vapor is compressed, superheated and its temperature is raised from $t_1$ to $t_1+\Delta t_1$, wherein the portion $\Delta t_1$ covers:

a) the rise $\alpha_1$ of the boiling point of the brine of the first stage due to increased salinity and b) the temperature difference $D_1$ which will increase the enthalpy of the superheated vapor $S_1$ to cause a relatively quick evaporation of the brine.

For the overall required temperature rise of the vapor at the first stage, the relationship holds: $\Delta t_1 = \alpha_1 + D_1$, or in general for the stages that follow: $\Delta t_v = \alpha_v + D_v$.

The superheated vapor $S_1$, after the heat transfer in the heat-exchanger, is cooled-down and condensed. The condensate and desalinated water $44_1$, descends to the bottom of the peripheral channel $41_1$, from where it is pumped along with the corresponding condensates of the other stages and is directed to the multi-stream external water-water heat-exchanger of the pre-heating of the feed-water 40 and from there to the storage space.

The brine, which has not been evaporated in the first stage and is colder, is passed to the next evaporation chamber $d_2$ of the second stage. There it follows the same evaporation and compression process. In order to achieve the same production of desalinated water $44_v$ at each and every stage, the surface of the vane $220_2$ and of the corresponding compression chamber are larger, compared to the first stage (or, in generally, to the previous stage).

The compression ratio $CR_2$ also varies in order to achieve the required temperature rise $\Delta t_2$ of the superheated vapor $S_2$. The saturated vapor having the temperature $t_2$ of the brine of the second stage, is sucked into the compression chamber $207_2$ of the stage, is compressed, superheated and is guided through the corresponding peripheral channel $215_2$ and the vertical duct $37_2$ in the second stage heat-exchanger at a lower temperature $t_2+\Delta t_2$, compared to the corresponding one of the first stage $t_1+\Delta t_1$ (the relationship holds: $t_v+\Delta t_v < \ldots < t_2+\Delta t_2 < t_1+\Delta t_1$).

The process is repeated in the third and the fourth (last stage), with the brine circulating from stage to stage becoming colder and saltier and the temperature of the superheated vapor $S_v$ becoming also gradually lower.

The unit instead of an electric motor can use an internal combustion engine, so there will simultaneously be a permanent supplementary and auxiliary heat supply, significantly improving the start-up and the efficiency of both drivetrain and desalination.

FIGS. 8a, 8b, 9, 10, 11, 12 show the cross-sections 9-9, 10-10, 11-11, 12-12 of an embodiment of the Multi-stage Desalination MVC-MEE/MED showing similarities to the variant MVC-MEE/MED of FIGS. 5, 6 such as:

They have the same rotary-radial compressor 306, with the four chambers and the vanes $320_v$, the collection chambers $308_v$, the vertical spacers $303_v$ and $309_v$, the horizontal flat partitions $310_v$, the two sub-chambers $311_v$ and $312_v$, the suction check-valves $321_v$ and compression check-valves $322_v$ and the suction pre-chambers $346_v$ ($346_1$-$346_4$).

Collection chambers $308_v$ and compression chambers $307_v$, have as their bottom the partition plane $345_v$ under which the four suction pre-chambers $346_v$ are developed.

The suction sub-chambers $311_v$ are connected directly, via their permanently open bottoms, with their corresponding pre-chambers $346_v$.

The compressor is also covered by flat roofs $313_v$ of gradually and stepwise increased heights, enclosed by a cylindrical housing 318, while the bottom $347_v$ forms its lower outer cover and at the same time the bottom of the suction pre-chambers $346_v$. The surfaces of the vanes $320_v$ are gradually and stepwise increased as are the cross-sections of the compression chambers $307_v$.

This is therefore the same system compared to that of FIGS. 5, 6 with the only difference in the shape and arrangement of the evaporation chambers and the heat-exchangers, as described below:

The four evaporation chambers $L_v$, with the inside incorporated heat-exchangers, are longitudinal and of parallelepiped shape, arranged in pairs and in two parallel rows. The two rows are located adjacent to each other forming a common parallelepiped consisting of the four parallelepipeds, all of which having a common junction point.

The four chambers are mounted with their largest surface on an elevated frame below which there are pipelines, pumps and all the auxiliary machinery and devices. Not designed.

The outer coverings $101_v$ of the evaporation chambers $L_v$ are slightly convex in order to increase stiffness due to vacuum conditions prevailing within. Inside the evaporation chambers $L_v$, vapor-water heat-exchangers $132_v$ are developed, consisting of a bundle of horizontal preferably flattened tubes $133_v$ which terminate in two narrow vertical collector-chambers, the inlet collector-chambers $110_v$ of the superheated vapor, and the outlet collector-chambers $111_v$ of the condensates $44_v$, with the corresponding vertical and flat frontal plates (tube sheets) $134_v$ and $135_v$ respectively. The inlet collector-chambers $110_v$, are restricted by the frontal plates (tube sheets) $134_v$ and by their external side walls $112_v$.

Above the heat-exchangers, there are the brine spray systems $139_v$, while in the lower part, the brine basins $131_v$ are developed.

Between the external side walls $112_v$ of the inlet collector-chambers $110_v$ and the outer coverings $101_v$ with which the stages are in contact in pairs frontally to each other, develop narrow, flattened vertical duct-chambers $114_v$. They extend over the entire width and height of the evaporation chamber $L_v$, in parallel to the inlet collector-chambers $110_v$ connecting the upper part of the basins $131_v$ with the suction pre-chamber $346_v$ of the compressor 306 corresponding to the stage.

The duct-chambers $114_v$ correspond to the vertical ducts $46_v$, rising upwards, of the saturated vapors of the corresponding variant of FIGS. 5-6.

From the center of the unit, namely from the four-stages' common junction, passes the already known narrow sleeve-cylinder 102 with the rotation shaft 316 and the rotor at its center and the compressor 306 at the top.

The double compression sub-chambers $312_v$ are connected to the inlet collector-chambers $110_v$ of the heat-exchangers $132_v$ through the double ducts $337_v$ which terminate on the two opposite sides of the inlet collector-chambers $110_v$ directing alternately, due to the dual-action, the superheated vapors from two different and opposite points of the collector-chambers, increasing the heat transfer coefficient and the overall efficiency of the heat-exchanger. See also FIGS. 8a, 8b.

In another variation there may be only a single vapor duct $337_v$ from each sub-chamber $312_v$ to the corresponding inlet collector-chamber $110_v$.

The Operation of the Compressor 306 and the MVC-MEE/MED System of FIGS. 8a, 8b, 9, 10, 11, 12

The similarities of the operation of the compressor 306 and the MVC-MEE/MED of FIG. 5, 6, are obvious.

The feed-water 40 is pre-heated at the known specific temperature by both the rejected brine $136_4$ of the fourth stage and the desalinated water $44_v$ and is supplied to the evaporation chamber $L_1$ of the first stage.

The brine $136_1$ is pumped from the bottom of the evaporation chamber $L_1$ and is sprayed through the overlying spray nozzle system $139_1$ externally onto the bundle of horizontal tubes $133_1$ of the water-vapor heat-exchangers $132_1$ in the interior of which flows the superheated vapor of the first stage, which descends through the ducts $337_1$ and is distributed to the tubes $133_1$ via the inlet collector-chamber $110_1$.

The saturated vapor produced, descends along with the sprayed brine in the basin $131_1$, where, due to the lower pressure created at the compressor's suction side, is sucked up vigorously and rises through the vertical duct-chamber $114_1$ in the suction pre-chamber $346_1$ to be compressed.

The superheated vapor condenses and as a condensate and desalinated water $44_1$, flows along the length of the horizontal tubes $133_1$ and descends to the bottom of the opposite terminal collector-chamber $111_1$ of the condensates. The process is repeated in the other stages, as per known.

In another variation, the evaporation chambers $d_v$ and $L_v$, as already developed in the two previous embodiments of MVC-MEE/MED, with the heat-exchangers incorporated in their interior, the intermediate vertical duct $46_v/114_v$ and the compressor with the suction pre-chambers $246_v/346_v$, could also be used for MVC-MSF applications.

As such, the water-vapor heat-exchangers $eC_v$ of the pre-heating feed-water 40 of MVC-MSF, will take the place of the vapor-water heat-exchangers $32_v/132_v$ inside the evaporation chambers $d_v$ and $L_v$ and no particular condensation chamber $C_v$ will be required.

The condensate (desalinated water) is collected, as in the case of MVC-MEE/MED, from the bottom of their heat-exchangers' $eC_v$ in the peripheral channels $41_v/111_v$. Obviously the pumping and sprayer system of the brine is not needed in the MVC-MSF application and will be removed.

FIGS. 13, 14 show in cross-sections 13-13 & 14-14, schematically, a multi-stage application of three-stage Flash Evaporation Desalination (MVC-MSF) wherein the dual action positive displacement reciprocating compressor 506 (FIG. 7) is comprised of three cylindrical compression chambers $52_v$ ($52_1$-$52_3$) sequentially and in series arranged, having corresponding vanes $50_v$ ($50_1$-$50_3$) of circular form.

The vanes are parallel to each other and are mounted to a common horizontal shaft 51, perpendicular to their surface, which moves reciprocally and linearly by a drive mechanism.

The operation of the new embodiment is absolutely analogous to that already described in FIGS. 1-4 with the exception that the compressor 506 is of cylindrical form and the evaporation chambers $b_v$ ($b_1$-$b_3$) as well as the heat-exchanger chambers $54_v$ ($54_1$-$54_3$) are arranged in series (long tubes heat-exchangers), respectively with the compressor's chambers. The surfaces of the vanes $50_v$ ($50_1$-$50_3$) as well as the cross-sections of the respective compression chambers $52_v$ ($52_1$-$52_3$), both being of any geometrical shape, are also preferably gradually increased.

The compression chambers $52_v$ are developed in the upper part of the unit and preferably outside the evaporation chambers $b_v$ ($b_1$-$b_3$). Under the evaporation chambers $b_v$ are located the condensation chambers of the water-vapor heat-exchangers $54_v$ ($54_1$-$54_3$) corresponding to the stages, while in the present variation the heat-exchangers are a bundle of straight horizontal long tubes 53 into which feed-water 40 circulates and is gradually pre-heated.

There are also here the relevant vapor suction and compression both, check-valves $524_v$ and $525_v$, as well as ducts 543a and 543b respectively, communicating with the evaporation chambers $b_v$ ($b_1$-$b_3$) and the respective condensation chambers of the heat-exchangers $54_v$ ($54_1$-$54_3$).

The feed-water 40, after being pre-heated, enters initially the collector 555, is distributed to the long tubes 53, is pre-heated gradually to the known specific temperature $t_a$ (corresponding to the boiling temperature of the brine of the first stage) and through the terminal collector 556, the pipe 47 and the control-valve 548, enters the evaporation chamber $b_1$ of the first stage, where the known flash evaporation and condensation process follows, as described in FIGS. 1-4.

The compression ratio (CR) as well as the temperatures rise, are also here independently regulated parameters.

In another variation the compressor 506 and the compression chambers are located between heat-exchanger chambers $54_v$ ($54_1$-$54_3$) and evaporation chambers $b_v$ ($b_1$-$b_3$), whereby the lengths of the ducts 543a and 543b will be significantly shorter. Not designed.

In another variation, the chambers of the heat-exchangers $54_v$ are located in the same plane and adjacent to the evaporation chambers $b_v$ of the respective stages. Not designed.

In another variation the evaporation chambers $b_v$ are cylindrical, the compressor 506 and the cylindrical compression chambers are located within the respective evaporation chambers $b_v$, and the heat-exchangers $54_v$ with the horizontal long tubes of the bundle of feed-water are developed on a peripheral cylindrical sector-sleeve coaxially around the evaporation chambers $b_v$ covering them along the entire length. Not designed.

In another variation the heat-exchangers $54_v$ are located within the evaporation chambers $b_v$. Not designed.

In another general variation the heat-exchangers instead of being tubular are plate-like.

There will also be variants of Multi-Stage Desalination units MVC-MEE/MED where the compressor is of cylindrical type 506.

The complete independence of the stages allows them to be divided in smaller, standard and prefabricated modules, in order large plants/units to be easily transported in containers.

In another variation, the vanes' surfaces of the rotary-radial compressors are trapezoidal or of another shape, whereby the roof of the compressor is of a correspondingly shaped surface.

In another variation of the rotary-radial compressors, instead of gradually and stepwise increasing the height of the compression chambers, by keeping constant the length of the radius of their vanes, the radius is stepwise increased by keeping constant the height of the compression chambers. Also the evaporation chambers may be of different types e.g. of dynamic type with moving-rotating parts, etc.

A common feature of all the variants of MVC-MEE/MED and MVC-MSF of the present invention is that the multi-stage desalination, resembles and consists essentially of an array of co-operating independent single-effect desalination units arranged and connected in series, with simple common connections and synergies with each other, such as:

a) the brine $36_v$ circulating from stage to stage, b) the desalinated water $44_v$ circulating from stage to stage, c) the pre-heating of the feed-water in the common multi-stream external heat-exchanger, d) the pre-heating of the feed-water from the last to the first stage through a common water-vapor heat-exchanger.

The last synergy/feature d) is the main one for the variants MVC-MSF, but it could also exist as complementary to MVC-MEE/MED variants.

Additionally, the three main elements of each stage (e.g. compression chambers, evaporation and heat-exchanger chambers) of the variants of FIGS. 1-4 and FIGS. 5, 6 correspond and lie one above the other (or inside one to the other) in such a way that the stages can be prefabricated as independent cylindrical parts-segments (modules) and assembled into a complete cylinder forming the cylindrical body of the unit.

The same thing happens in the case of parallelepiped evaporation chambers of linear arrangement.

Benefits in General

Increased production for the same vapor suction volume, since both independent suction of the saturated vapor of each stage and compression/condensation of the superheated vapor within the same stage, occurs. Meaning that vapors of clearly higher temperatures and therefore of lower specific volume (containing a greater mass of water vapor) are sucked in comparison to the prior art which sucks saturated vapor by a single compressor, only from the last and colder stage, whose vapor has the largest specific volume of the unit and contains therefore the smallest mass of water vapor.

Increased production due to augmented suction volume as the suction is more intense due to lower pressure created at the inlet of each suction sub-chamber of the compression chambers.

Reduced heat-exchangers' surface, due to increased overall heat transfer coefficient (caused by the increased velocity and forced movement of superheated vapors in the condenser/heat-exchanger areas).

Reduced energy cost per unit produced ($m^3$ of desalinated water) due to reduction of entropy, because of independent and partial compression in very small steps (smaller CRs and smaller temperature differences $\Delta t_v$ between the stages).

More precise control of the state's conditions and the smallest permissible temperature differences ($\Delta t_v$) because of independent control, adjustment and operation of the stages {a smaller overall temperature difference $\Delta T_{max}$ (since $\Delta T_{max} = \Sigma \Delta t_v$) and a reduction of the specific energy consumption, is achieved}.

Increased number of stages for the same overall maximum temperature difference $\Delta T_{max}$ ($=\Sigma \Delta t_v$) of the unit (higher efficiency) due to easier and more effective control of very small temperature differences ($\Delta t_v$).

Faster startup of process, as suction and compression are performed simultaneously from multiple chambers and smaller CRs.

Reduce volume of the unit and ability to manufacture and transport more productive units.

Apart from the obvious balance of the preferably dissimilar (gradually increased) surfaces of the rotor's vanes, there are also methods to compensate, the rotational and reciprocating masses-movements of the system, caused by the rotating torques that are continuously changing direction, minimizing the vibrations.

In the case of installing more than one unit, every two similar units mounted to a common frame, will rotate synchronized, at the same time, in opposite directions.

In another variation a unit is placed exactly above the other (arrangement in pagoda layout), both units are mounted in a common frame with rotors and shafts laying in the same vertical axis, driven by the same drive mechanism, which transmits, at the same time, opposite rotational torques to both rotors.

Also two units could be installed horizontally, in series, on a single and common base frame with a common drive transmitting opposite rotational torques. Not designed.

In the case of cylindrical reciprocating compressors 506 wherein the movement is linear, there are provided:

a) a mass attached to the drive mechanism which moves, at any time, opposite to the main movement of the compressor shaft 51, or b) (in the case of more than one unit) every two similar and aligned units (with the horizontal shafts 51 laying in the same axis) with a common frame, are moved synchronized, but opposite to each other, having the same drive unit positioned between them and at the center of their straight and aligned arrangement (boxer layout). Not designed.

The compression ratio (CR) adjustment system includes and utilizes all the known techniques of the reciprocating compressors of positive displacement for gases and vapors, such as: the adjusting techniques of the opening and closing pressures of the suction $21_v$ and compression $22_v$ checkvalves, etc.

The adjustment of flow rates is usually done by varying the size of the surface of the vanes, the reciprocating movement frequency, but also by varying the cross-section of: a) the internal by-pass of adjustable sliding openings 123 onto the vane surface or b) the external by-pass ducts with adjustable control-valves, affecting accordantly the recirculated flow rate portion. Not designed.

In reciprocating motion systems of constant frequency (mainly at units of very large sizes), the adjustment of the flow rates is set in discrete steps and rates of the nominal flow, e.g. at 100%, 75%, 50%, 25% or 0% of it.

Applications: a) in the chemical industry and the food industry for the condensation of aqueous solutions by the gradual evaporation and condensation of a substantial part of the water or other solvents, b) in the environment protection by further condensation of the brine rejected from reverse osmosis desalination plants {Zero Liquid Discharge (ZLD)} or by evaporating water from aqueous solutions of toxic and industrial waste in order to reduce their volume and facilitate their transport and neutralization.

Particularly in desalination, wherein due to the highest quality of desalinated water achieved (≥5-6 ppm TDS) it can be used throughout the broad spectrum of the chemical industry where high quality water is required.

What is claimed is:

1. A method for treating water, the method comprising:
   (a) providing:
      (a)(i) a plurality of evaporation chambers ($e_v$, $d_v$, $L_v$, $b_v$);
      (a)(ii) a plurality of heat-exchangers or heat-exchanger chambers ($C_v$, $32_v$, $132_v$, $54_v$), each corresponding a respective one of the plurality of evaporation chambers;
      (a)(iii) a compressor (6, 206, 306, 406), comprising a plurality of independent compression chambers ($7_v$) and respective vanes ($20_v$, $220_v$, $320_v$, $50_v$), each vane configured to move within an active compression area of a respective one of the compression chambers, the active compression area extending between a pair of partitions ($9_v$);
         wherein multiple effects are provided, each effect being formed by an evaporation chamber and the respective one of the heat-exchanger or the heat-exchanger chamber;
         wherein each compression chamber is associated with a respective one of the effects, such that pressure ratio, temperature lift, vacuum height, and flow rate required are different for the different effects;
         wherein volumes of the compression chambers and the surfaces of the respective vanes differ between the compression chambers;
         wherein the compression chambers are adjacent sections of a cylinder and are separated by spacers (3) extending along different radii of the cylinder, such that each compression chamber ($7_v$) is adjacent to two compression chambers and separated from a compression chamber of a preceding effect via a first spacer and from a compression chamber of a subsequent effect via a second spacer, each compression chamber ($7_v$) comprising:
            a first collection chamber ($8_v$) extending between the first spacer and the first partition ($9_v$) and a second collection chamber ($8_v$) extending between the second spacer and the second partition, such that the active compression area is located between the first collection chamber and the second collection chamber;
         wherein each collection chamber ($8_v$) comprises:
            a suction sub-chamber ($11_v$) in fluid communication with the evaporation chamber of the same effect; and
            a compression sub-chamber ($12_v$) separated from the suction sub-chamber ($11_v$) via a horizontal partition ($10_v$), each compression sub-chamber being is fluid communication with the heat-exchanger or the heat-exchanger chamber of the effect associated with compression chamber;
         wherein at least one first valve is located on a portion of the partition which separates the active compression area of the compression chamber from the suction sub-chamber and at least one second valve is located on a portion of the partition which separates the active compression area from the compression sub-chamber;
      (a)(iv) a common rotor (14) located on a center of the cylinder, the rotor being joined to the plurality of vanes.
   (b) driving feed-water into an external heat-exchanger, to generate heated feed-water;
   (c) driving the heated feed-water into the evaporation chamber of the first effect;
   (d) evaporating the heated feed-water to create vapor and brine in the evaporation chamber of the first effect, and directing the brine to the evaporation chamber of the next effect;
   (e) at each effect, evaporating the brine in the evaporation chamber, to create further vapor and further brine, and directing each further brine to the evaporation chamber of a following effect;

(f) at each compression chamber moving the vane circumferentially inside the active compression area away from the first partition, to lower pressure in a portion of the active compression area located between the vane and the first partition, causing the at least one first valve on the first partition to open, to suck the vapor from the evaporation chamber of the effect associated with the compression chamber into a first one of the suction sub-chambers and into a portion of the active compression area;

(g) at each compression chamber moving the vane circumferentially inside the active compression area toward the first partition, to compress the vapor in the portion of the active compression area located between the vane and the first partition and thereby generate the super-heated vapor, and causing closing of the at least one first valve on the first partition and opening of the at least one second valve of the compression sub-chamber on the first partition, to direct the super-heated vapor to the compression sub-chamber;

(h) at each effect, discharging the super-heated vapor from the compression sub-chamber associated with the effect into the heat-exchanger or the heat-exchanger chamber of the effect via a duct, such that the super-heated vapor in the heat-exchanger or the heat-exchanger chamber exchanges heat with the feed-water and condensates into treated water;

wherein brine temperature at each effect is lower than brine temperature at a preceding effect.

2. The method of claim 1, wherein the evaporation chambers ($b_v$) are linearly arranged.

3. The method of claim 1, wherein the evaporation chambers ($d_v$, $e_v$) are sectors of a cylinder separated from each other via spacers (3) extending along different radii of the cylinder.

4. The method of claim 1, wherein the evaporation chambers are of parallelepiped shape ($L_v$), or cylindrical shape ($b_v$).

5. The method of claim 1, wherein step (a) comprises:
providing a plurality of suction pre-chambers ($246_v$, $346_v$), each being in fluid communications with a respective evaporation chamber ($e_v$, $d_v$) and a respective pair of suction sub-chambers of the same effect.

6. The method of claim 1, wherein step (a) comprises:
providing a sleeve-cylinder (2) in the middle of and concentric with the cylinder, wherein the common rotor is located in the sleeve cylinder.

7. The method of claim 1, wherein the vanes ($20_v$) slide into radially arranged slots in the interior of the rotor (16), and are supported by springs ($20_a$).

8. The method of claim 1, wherein the vanes are mounted to the rotor via arms ($121_v$) shorter than the vanes.

9. The method of claim 1, wherein step (a) comprises:
providing a drive mechanism for moving the vanes, the drive mechanism comprising a rotary motor (26) a crankshaft (27), a connecting rod (28), a rack (29) and a pinion.

10. The method of claim 1, wherein radii of the vanes ($20_v$) and of the compression chambers ($7_v$) are equal to each other, while heights and volumes of the compression chambers differ to each other and stepwise increase as the temperature of the corresponding effects decreases.

11. The method of claim 1, wherein step (a) comprises:
wherein the heights of the vanes ($20_v$) and of the compression chambers ($7_v$) are kept constant while their radii are stepwise increased towards the effects of the lowest temperature.

* * * * *